US007484580B2

(12) United States Patent
Yamaguchi et al.

(10) Patent No.: US 7,484,580 B2
(45) Date of Patent: Feb. 3, 2009

(54) TRACTOR

(75) Inventors: Tatsuo Yamaguchi, Osaka (JP); Noboru Yamamoto, Osaka (JP); Bunei Katagiri, Osaka (JP); Keiichi Hayashi, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 419 days.

(21) Appl. No.: 10/558,182

(22) PCT Filed: Jul. 17, 2003

(86) PCT No.: PCT/JP03/09131

§ 371 (c)(1),
(2), (4) Date: Dec. 21, 2005

(87) PCT Pub. No.: WO2004/103760

PCT Pub. Date: Dec. 2, 2004

(65) Prior Publication Data
US 2006/0272867 A1 Dec. 7, 2006

(30) Foreign Application Priority Data
May 23, 2003 (JP) ............................. 2003-146786

(51) Int. Cl.
*B60K 17/28* (2006.01)
(52) U.S. Cl. .................... 180/53.6; 74/15.4; 74/15.82
(58) Field of Classification Search ............... 180/53.1, 180/53.6, 53.61, 53.62, 53.7; 74/11, 15.4, 74/15.6, 15.66, 15.82, 15.84, 15.86, 606 R
See application file for complete search history.

(56) References Cited

U.S. PATENT DOCUMENTS 3,733,912 A * 5/1973 Murayama et al. .......... 74/15.4
4,294,131 A * 10/1981 Murayama ................ 74/15.4
4,373,597 A * 2/1983 Itatani et al. .............. 74/15.4
4,565,102 A * 1/1986 Miyahara et al. ........... 74/15.4

(Continued)

FOREIGN PATENT DOCUMENTS

JP        49-7652         2/1974

(Continued)

*Primary Examiner*—John Q. Nguyen
*Assistant Examiner*—Drew J. Brown
(74) *Attorney, Agent, or Firm*—Jordan and Hamburg LLP

(57) ABSTRACT

The present invention aims at making a transmission casing compact. In the present invention, in the inside of a transmission casing, a traveling-system power transmission mechanism which is interposed between an engine and an axel, a PTO-system power transmission mechanism which is interposed between the engine and a PTO shaft, and a changeover mechanism which is interposed between both power transmission mechanisms are provided, wherein the power transmission of the PTO-system power transmission mechanism is interrupted at a middle portion thereof by the changeover mechanism and, at the same time, the changeover mechanism is allowed to perform a changeover manipulation to connect a downstream side portion of the PTO-system power transmission mechanism and a downstream side portion of the traveling-system power transmission mechanism. In this manner, it is possible to transmit the rotational speed proportional to the rotational speed of the engine to the PTO-shaft (first PTO-system power transmission) with the use of the PTO-system power transmission mechanism, while with the use of the changeover mechanism, it is possible to perform the changeover manipulation which interrupts the power transmission of the PTO-system power transmission mechanism in the middle portion thereof and, at the same time, connects the downstream-side portion of the PTO-system power transmission mechanism and the downstream-side portion of the traveling-system power transmission mechanism so as to transmit the rotational speed proportional to a vehicle speed to the PTO shaft (second PTO-system power transmission).

2 Claims, 11 Drawing Sheets

U.S. PATENT DOCUMENTS

| | | | | |
|---|---|---|---|---|
| 4,610,174 | A | * | 9/1986 | Takagi et al. .................. 74/15.2 |
| 4,727,759 | A | * | 3/1988 | Yamaoka et al. .............. 74/15.2 |
| 4,881,417 | A | * | 11/1989 | Yoshii et al. ................ 74/15.84 |
| 5,245,892 | A | * | 9/1993 | Kim et al. ............... 74/665 GA |
| 5,339,703 | A | * | 8/1994 | Tanaka ....................... 74/15.4 |
| 5,913,950 | A | * | 6/1999 | Matsufuji .................. 74/730.1 |
| 6,986,295 | B2 | * | 1/2006 | Kajino et al. ................. 74/329 |

FOREIGN PATENT DOCUMENTS

| | | |
|---|---|---|
| JP | 53-15880 | 4/1978 |
| JP | 55-177542 | 12/1980 |
| JP | 57-38939 | 3/1982 |
| JP | 57-100647 | 6/1982 |
| JP | 58-44225 | 3/1983 |
| JP | 1-65721 | 4/1989 |
| JP | 2-274627 | 11/1990 |
| JP | 5-162550 | 6/1993 |
| JP | 7-10925 | 3/1995 |
| JP | 2002-127770 | 5/2002 |
| WO | WO-02/34561 A1 | 5/2002 |

* cited by examiner

TRACTOR

TECHNICAL FIELD

The present invention relates to a tractor.

BACKGROUND ART

Conventionally, as a type of a tractor, there has been known a tractor which includes, in a transmission casing thereof, a traveling-system power transmission mechanism which is interposed between an engine and an axle, a first PTO-system power transmission mechanism which is interposed between an engine and a PTO shaft, and a second PTO-system power transmission mechanism which is interposed between a downstream portion of the traveling-system power transmission mechanism and a PTO shaft (see Japanese Utility Model Accepted Publication Hei7(1995)-10925, for example).

Further, a PTO transmission chamber is formed in a rear portion of the inside of the transmission casing, and in the inside of the PTO transmission chamber, a PTO shaft, a PTO transmission mechanism which performs a speed change of the PTO shaft, and a change over mechanism which selectively connects either one of a downstream end portion of the first PTO-system power transmission mechanism and a downstream end portion of the second PTO-system power transmission mechanism with the PTO shaft in a changeable manner are provided.

Further, in the traveling-system power transmission mechanism, an axel is interlockingly connected with a distal end portion of a traveling-system power transmission shaft which has a proximal end portion thereof interlockingly connected with the engine by way of a differential mechanism, wherein the differential mechanism and the above-mentioned first PTO-system power transmission mechanism, second PTO-system power transmission mechanism and PTO transmission chamber are arranged in a rear portion in the inside of the transmission casing.

Here, the first PTO-system power transmission mechanism is a power transmission mechanism which transmits a rotational speed proportional to a rotational speed of the engine to the PTO shaft (so-called live PTO-system power transmission mechanism), while the second PTO-system power transmission mechanism is a power transmission mechanism which transmits a rotational speed proportional to a vehicle speed to the PTO shaft (a so-called ground PTO-system power transmission mechanism).

In the above-mentioned tractor, however, since the differential mechanism, the first PTO-system power transmission mechanism, the second PTO-system power transmission mechanism and the PTO transmission chamber are arranged in the rear portion of the inside of the transmission casing, the transmission casing becomes large sized, whereby a weight and a manufacturing cost of the transmission casing are increased and, at the same time, the structure of the transmission casing becomes complicated thus leading to a cumbersome maintenance operation or the like.

Further, in the inside of the PTO transmission chamber, besides the PTO transmission mechanism, the changeover mechanism which connects either one of the downstream end portion of the first PTO-system power transmission mechanism and the downstream end portion of the second PTO-system power transmission mechanism with the PTO shaft in a selectively changeable manner is provided and hence, the structure of the inside of the PTO transmission chamber becomes complicated thus making a maintenance operation of the inside of the PTO transmission chamber or the like cumbersome.

DISCLOSURE OF THE INVENTION

Accordingly it is an object of the present invention to provide a tractor which is characterized in that in the inside of a transmission casing, a traveling-system power transmission mechanism which is interposed between an engine and an axel, a PTO-system power transmission mechanism which is interposed between the engine and a PTO shaft, and a changeover mechanism which is interposed between both power transmission mechanisms are provided, the power transmission of the PTO-system power transmission mechanism is interrupted at a middle portion thereof by the changeover mechanism and, at the same time, the changeover mechanism is allowed to perform a changeover manipulation to connect a downstream side portion of the PTO-system power transmission mechanism and a downstream side portion of the traveling-system power transmission mechanism.

Further, the present invention is also characterized by following constitutions.

(1) The changeover mechanism includes a traveling-system power transmission gear which is mounted on a traveling-system power transmission shaft which constitutes a portion of the traveling-system power transmission mechanism, a PTO-system power transmission gear which is mounted on an upstream-side PTO-system power transmission shaft which constitutes a portion of the PTO-system power transmission mechanism, and a shift gear body which is arranged coaxially with the above-mentioned upstream-side PTO-system power transmission shaft and is mounted on a downstream-side PTO-system power transmission shaft which constitutes a portion of the PTO-system power transmission mechanism, wherein the shift gear body is formed by mounting a slide member on the downstream-side PTO-system power transmission shaft in an axially slidable manner and by forming a PTO-system side shift gear which is meshed with the PTO-system power transmission gear and a traveling-system side shift gear which is meshed with the traveling-system power transmission gear on the slide member, whereby with the sliding of the above-mentioned slide member, it is possible to perform a manipulation to selectively changeover the meshing between the PTO-system power transmission gear and the PTO-system side shift gear and the meshing between the traveling-system power transmission gear and the traveling-system-side shift gear.

(2) A PTO transmission part which includes the PTO shaft is detachably mounted on the transmission casing and, at the same time, an input shaft which is provided to the PTO transmission part is detachably connected to a downstream-side end portion of the PTO-system power transmission mechanism.

BEST MODE FOR CARRYING OUT THE INVENTION

Hereinafter, a mode for carrying out the present invention is explained.

That is, a tractor according to the present invention is characterized in that in the inside of a transmission casing, a traveling-system power transmission mechanism which is interposed between an engine and an axel, a PTO-system power transmission mechanism which is interposed between the engine and a PTO shaft, and a changeover mechanism which is interposed between both power transmission mechanisms are provided, the power transmission of the PTO-system power transmission mechanism is interrupted at a middle portion thereof by the changeover mechanism and, at the same time, the changeover mechanism is allowed to perform a changeover manipulation to connect a downstream side portion of the PTO-system power transmission mechanism and a downstream side portion of the traveling-system power transmission mechanism.

Further, the changeover mechanism includes a traveling-system power transmission gear which is mounted on a traveling-system power transmission shaft which constitutes a portion of the traveling-system power transmission mechanism, a PTO-system power transmission gear which is mounted on an upstream-side PTO-system power transmission shaft which constitutes a portion of the PTO-system power transmission mechanism, and a shift gear body which is arranged coaxially with the above-mentioned upstream-side PTO-system power transmission shaft and is mounted on a downstream-side PTO-system power transmission shaft which constitutes a portion of the PTO-system power transmission mechanism, wherein the shift gear body is formed by mounting a slide member on the downstream-side PTO-system power transmission shaft in an axially slidable manner and by forming a PTO-system side shift gear which is meshed with the PTO-system power transmission gear and a traveling-system side shift gear which is meshed with the traveling-system power transmission gear on the slide member, whereby with the sliding of the above-mentioned slide member, it is possible to perform a manipulation to selectively changeover the meshing between the PTO-system power transmission gear and the PTO-system side shift gear and the meshing between the traveling-system power transmission gear and the traveling-system-side shift gear.

Further, in the transmission casing, a PTO transmission part which includes the PTO shaft is detachably mounted on the transmission casing and, at the same time, an input shaft which is provided to the PTO transmission part is detachably connected to a downstream-side end portion of the PTO-system power transmission mechanism.

Hereinafter, embodiments of the present invention are explained in conjunction with drawings.

Figure 1:
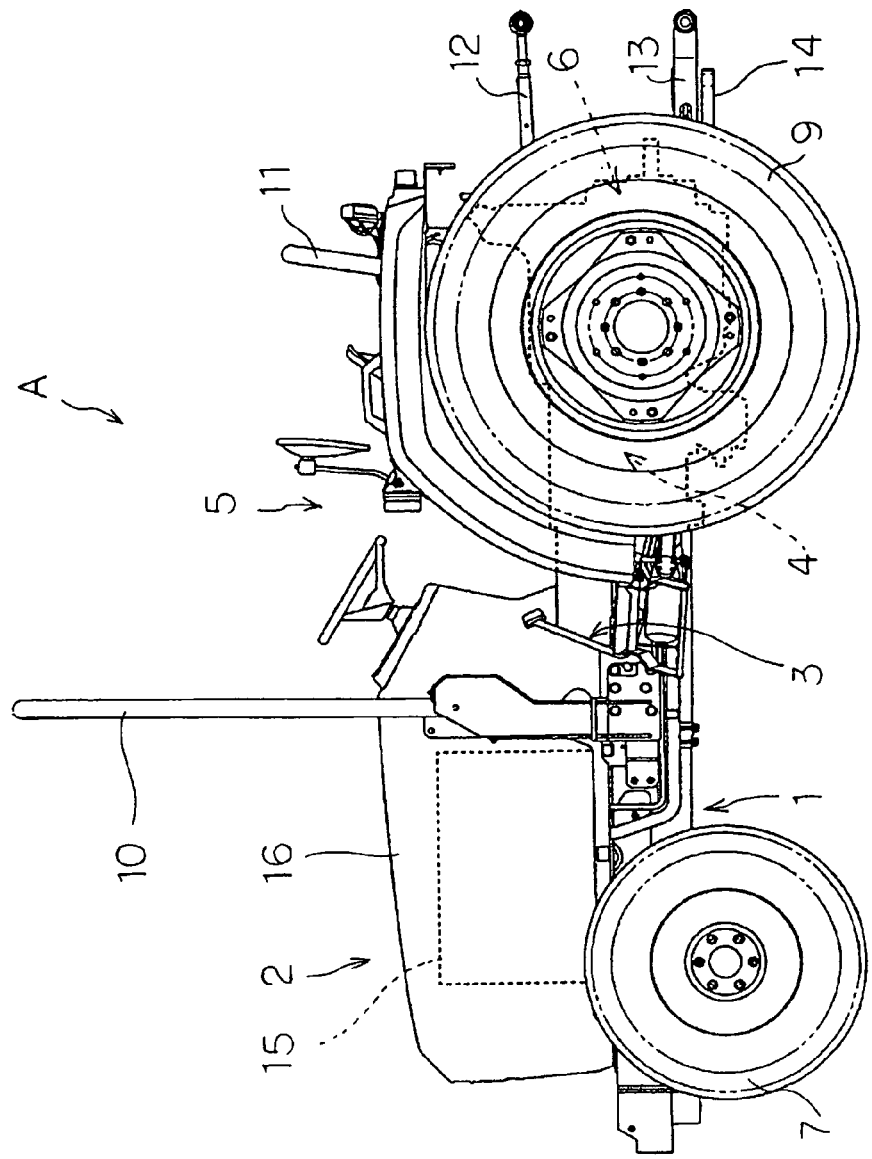
FIG. 1 is a side view of a tractor according to the present invention.

Symbol A shown in FIG. 1 indicates the tractor according to the present invention. In the tractor A, the prime mover part 2 is mounted on a body frame 1, the transmission part 4 is interlockingly and contiguously mounted on the prime mover part by way of a clutch part 3, a driver's portion 5 is arranged on the transmission part 4 and, at the same time, a PTO transmission part 6 is detachably and interlockingly connected with a rear portion of the transmission part 4, while a pair of left and right front wheels 7,7 are interlockingly connected to the transmission part below the above-mentioned body frame 1 by way of a front axle casing (not shown in the drawing), a pair of left and right rear wheels 9,9 are interlockingly connected with the above-mentioned transmission part 4 by way of rear axle casings 8,8 (see FIG. 9). Numeral 10 indicates a front portion guard frame, numeral 11 indicates a rear portion guard frame, numeral 12 indicates a top link for connecting a working machine to the tractor, numeral 13 indicates a lower link for connecting the working machine to the tractor, and numeral 14 indicates a working-machine connecting member.

In the prime mover part 2, as shown in FIG. 1, an engine 15 and the like are mounted on the body frame 1, wherein the engine 15 and the like are covered with a hood 16 in a state that the hood can be opened or closed.

Figure 2:
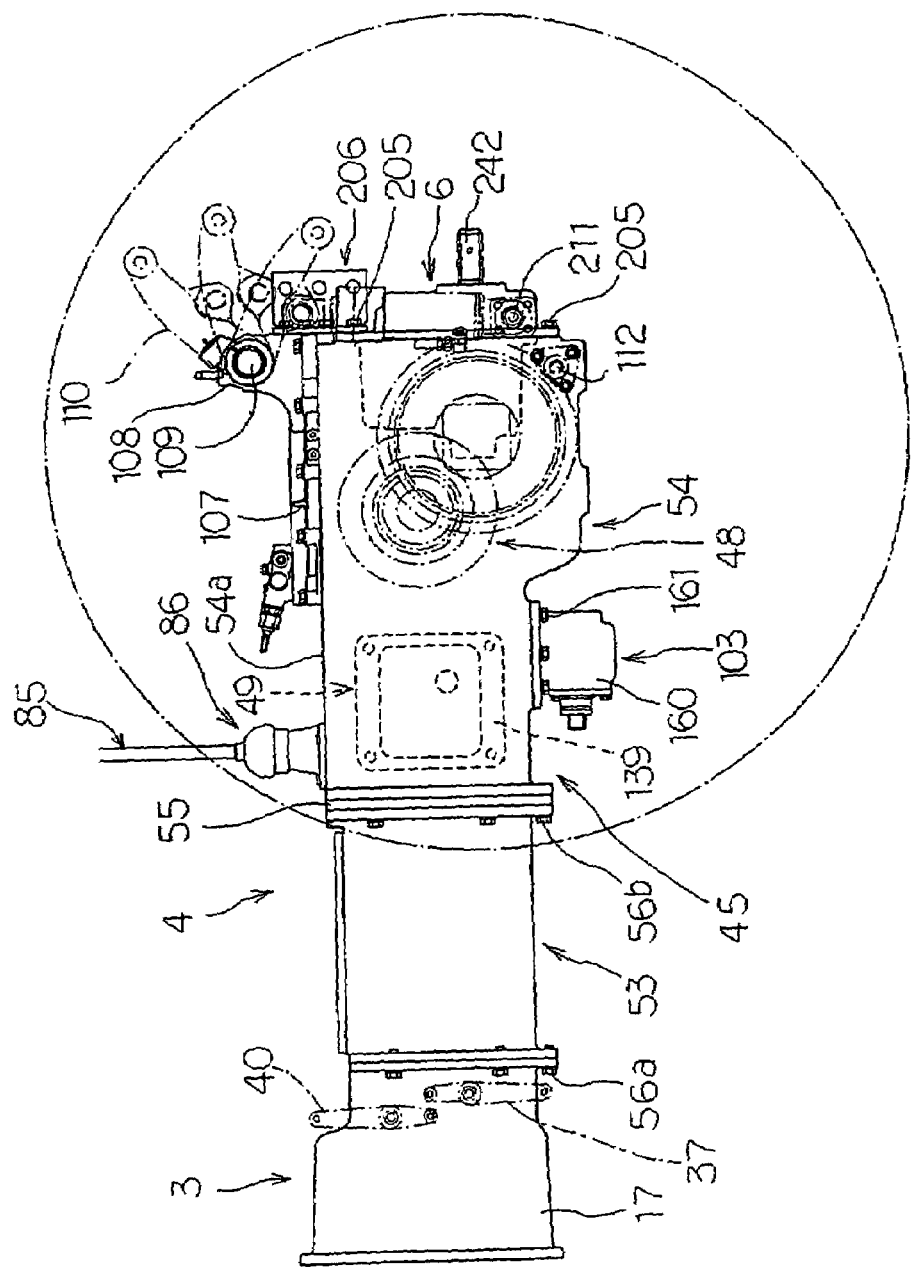
FIG. 2 is a side view of a clutch part and a transmission part.
Figure 3:
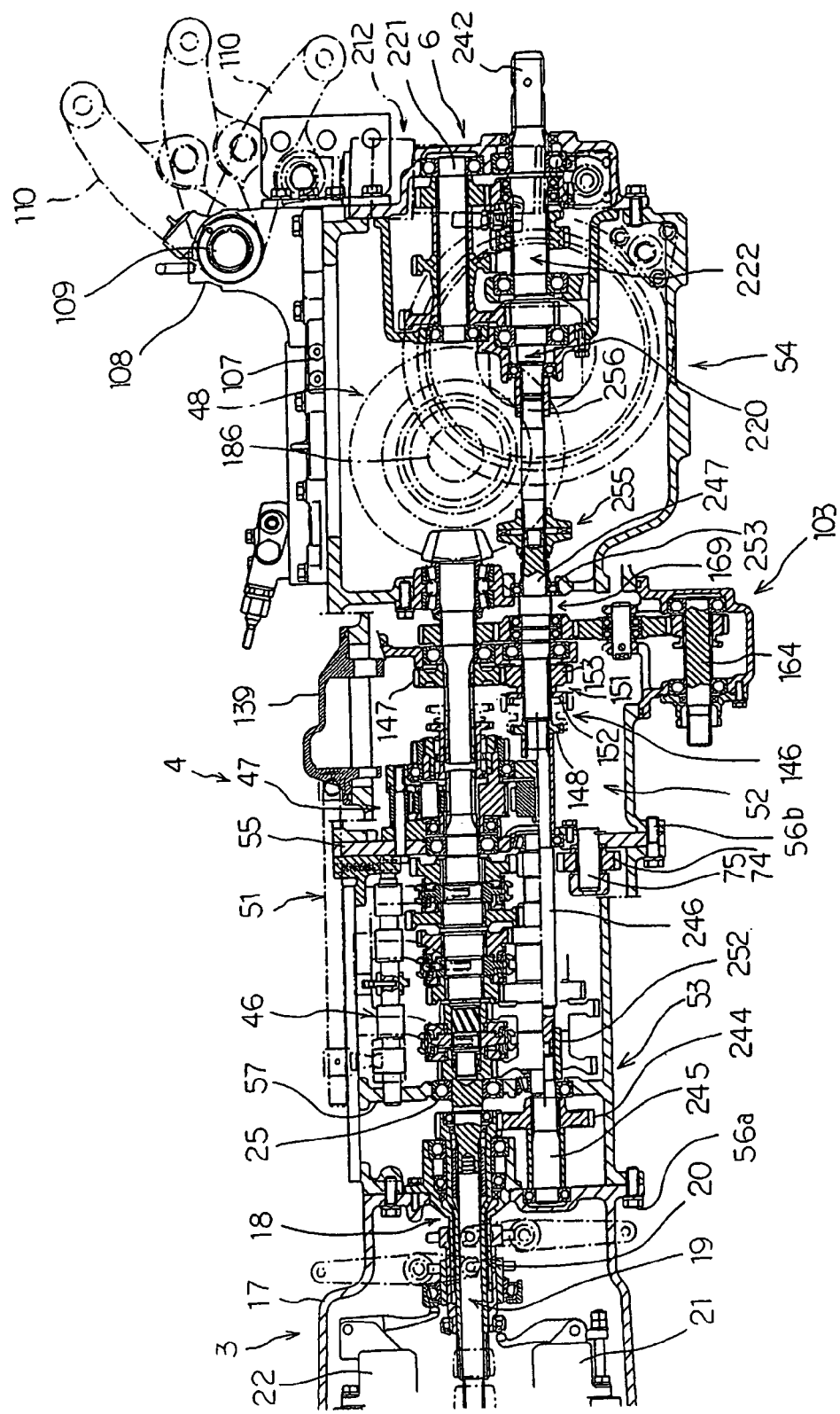
FIG. 3 is a cross-sectional explanatory side view of the clutch part and the transmission part.
Figure 4:
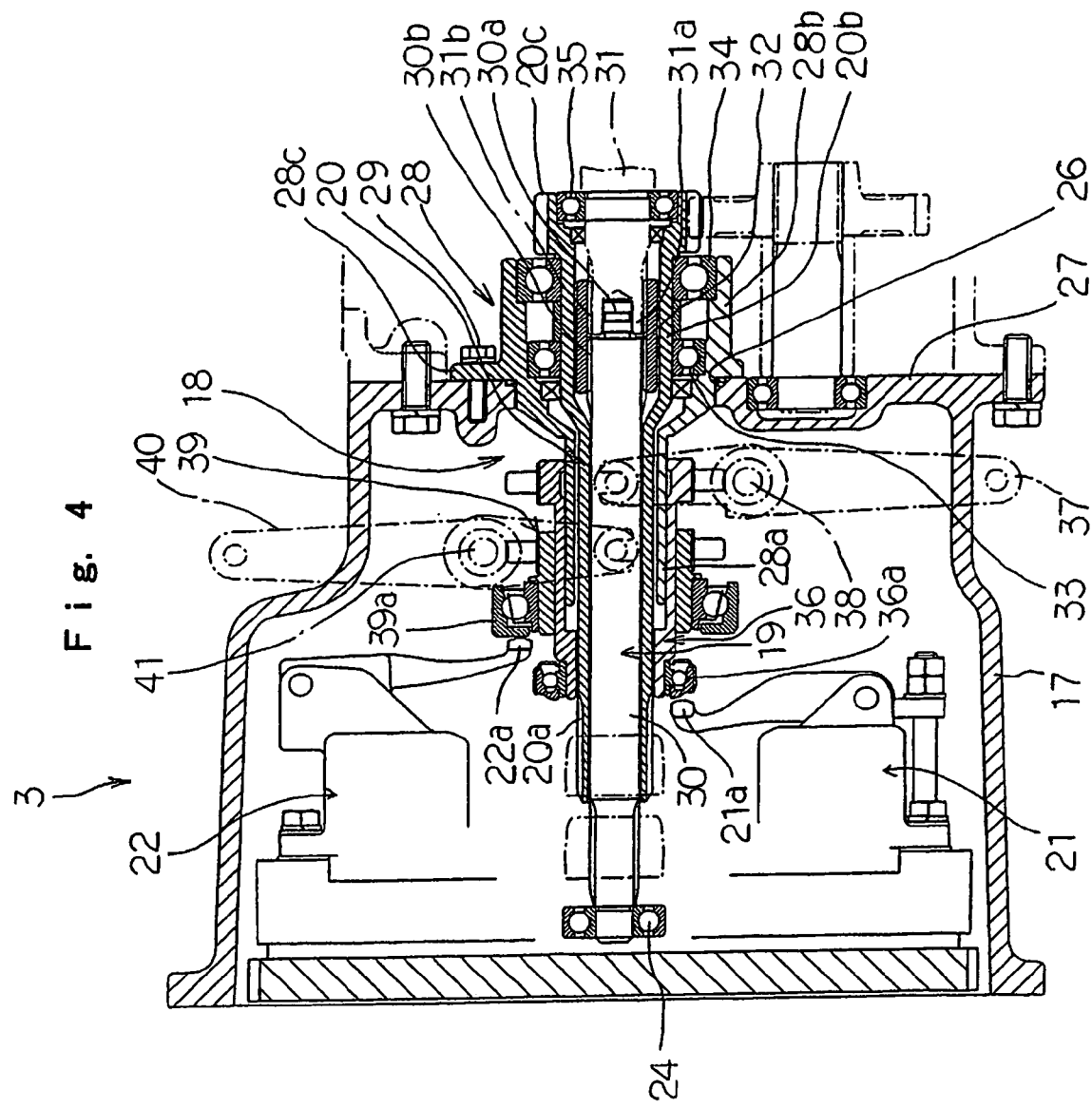
FIG. 4 is a cross-sectional explanatory side view of the clutch part.

The clutch part 3, as shown in FIG. 2 to FIG. 4, rotatably supports an inner-and-outer duplicate drive shaft body 18 which extends in the longitudinal direction in the inside of a clutch housing 17, wherein the inner-and-outer duplicate drive shaft body 18 is formed of an inner drive shaft 19 which extends in a longitudinal direction and a cylindrically-shaped outer drive shaft 20 which is rotatably fitted on an outer periphery of the inner drive shaft 19.

Further, out of the inner drive shaft 19 and the outer drive shaft 20, a proximal portion (a front end portion) of the inner drive shaft 19 is interlockingly connected with the engine 15 by way of a traveling clutch 21 and, at the same time, a distal end portion (a rear end portion) of the inner drive shaft 19 is interlockingly connected with a traveling-system power transmission mechanism 22 described later. Further, a proximal portion (front end portion) of the outer drive shaft 20 which constitutes another drive shaft is interlockingly connected with the engine 15 by way of a PTO clutch 22 and, at the same time, a distal end portion (a rear end portion) of the outer drive shaft 20 is interlockingly connected with a PTO-system power transmission mechanism 52 described later.

Here, a front-end-peripheral portion of the main transmission casing 53 of the transmission part 4 described later is detachably connected to a rear-end-peripheral portion of the clutch housing 17. In the above-mentioned inner-and-outer duplicate drive shaft body 18, a distal-end portion thereof is pivotally supported on a bearing 24 which is arranged at a front portion in the inside of the clutch housing 17, while a rear-end portion thereof is pivotally supported on a bearing 25 which is arranged on a front portion in the inside of the main transmission casing 53.

Further, a rear wall 27 having an opening portion 26 in the center portion thereof is formed on an inner peripheral portion of a rear end of the clutch housing 17. A cylindrical support body 28 which extends in the longitudinal direction is mounted on the rear wall 27 in a state that the cylindrical support body 28 passes through the opening portion 26. An outer-peripheral surface of the middle portion of the above-mentioned inner-and-outer duplicate drive shaft body 18 is supported by the cylindrical support body 28.

Then, in the cylindrical support body 28, a diameter of a front portion 28a thereof which is positioned in the inside of the clutch housing 17 is reduced and, on the other hand, a diameter of a rear portion 28*b* which is positioned in the inside of the main transmission casing 53 is enlarged. A mounting flange member 28*c* is formed on an outer-peripheral surface of the rear portion 28*b* and the mounting flange member 28*c* is brought into contact with a rear surface of the rear wall 27 of the clutch housing 17 from behind and, at the same time, is mounted on the rear wall 27 using a mounting bolt 29.

Further, the inner drive shaft 19 is formed in a split manner into a front split drive shaft member 30 and a rear split drive shaft member 31 and, at the same time, both of the split drive shaft members 30, 31 are interlockingly connected with each other in the inside of the outer drive shaft 20. A split position (interlocking connection portion) between the front split drive shaft member 30 and the rear split drive shaft member 31 is arranged in the vicinity of the connection portion of the clutch housing 17 and the main transmission casing 53, that is, in the inside of the rear portion 28*b* of the cylindrical support body 28.

Further, a distal-end portion of the front split drive shaft member 30 and a proximal-end portion of the rear split drive shaft member 31 are detachably and interlockingly connected with each other by spigot fitting.

That is, a fitting projection member 30*a* is mounted on a distal-end surface of the front split drive shaft member 30 in a state that the fitting projection member 30*a* projects in the rearward direction, while a proximal-end-side fitting recessed portion 31*a* is formed in a proximal-end surface of the rear split drive shaft member 31. The above-mentioned fitting projection member 30*a* is fitted in the inside of the proximal-end-side fitting recessed portion 31*a* by spigot fitting and, at the same time, a cylindrical connection body 32 having an axis thereof directed in the longitudinal direction is engaged with a spline groove 30*b* which is formed in an outer-peripheral surface of the distal-end portion of the front split drive shaft member 30 and a spline groove 31*b* which is formed in an outer-peripheral surface of the proximal-end portion of the rear split drive shaft member 31 by spline fitting.

The outer drive shaft 20 has a front portion 20*a* thereof formed with a small diameter along the outer peripheral surface of the inner drive shaft 19 and a rear portion 20*b* thereof formed with a large diameter along the outer peripheral surface of the above-mentioned cylindrical connection body 32 and, bearings 33, 34 are interposed between an outer peripheral surface of the rear portion 20*b* and an inner peripheral surface of the rear portion 28*b* of the cylindrical support body 28.

Further, a distal-end portion of the outer drive shaft 20 extends in the rearward direction than the rear end of the cylindrical support body 28 and a PTO drive gear 20*c* is integrally formed on the outer peripheral surface of the distal-end portion of the outer drive shaft 20. Numeral 35 indicates a PTO drive gear support bearing.

In this manner, the inner drive shaft 19 is formed in a split manner into the front split drive shaft member 30 and the rear split drive shaft member 31 and, at the same time, both of the drive shaft members 30,31 are interlockingly connected with each other in the inside of the outer drive shaft 20. Accordingly, compared to a conventional technique, that is, a technique in which a distal-end portion of an inner drive shaft is extended to the position behind the distal-end portion of the outer drive shaft and the distal-end portion of the inner drive shaft is coaxially and interlockingly connected with a proximal-end portion of a PTO-system input shaft in an abutted manner by way of a cylindrical shaft coupling, even when the clutch housing 17 and the main transmission casing 53 are connected to each other in the longitudinal direction and the inner-and-outer duplicate drive shaft body 18 passes through the inside of the clutch housing 17 and the main transmission casing 53, it is possible to overcome the drawback that the main transmission casing 53 becomes elongated or large-sized in the longitudinal direction.

Further, it is possible to facilitate an assembling operation when the clutch housing 17 and the main transmission casing 53 are connected as an assembly, and a maintenance operation which is performed after releasing the connection or the like.

Still further, since the split position between the front split drive shaft member 30 and the rear split drive shaft member 31 of the inner drive shaft 19 is arranged in the vicinity of the connection portion of the clutch housing 17 and the main transmission casing 53, it is possible to make a width of the main transmission casing 53 small in the longitudinal direction thus providing a compact body and, at the same time, it is possible to make a width of the assembling unit of the main transmission casing 53 small in the longitudinal direction thus realizing the reduction of the distribution cost of the assembling unit. As a result, a large number of units can be transferred at a time from outsourcing.

Here, the fitting projection member 30*a* which is formed on the distal-end portion of the front split drive shaft member 30 is detachably and interlockingly connected to the inside of the proximal-end-side fitting recessed portion 31*a* which is formed on the proximal-end portion of the rear split drive shaft member 31 by spigot fitting and hence, the front split drive shaft member 30 and the rear split drive shaft member 31 which are formed in a split manner can be assembled with high accuracy and can be interlockingly connected.

Further, a traveling cylindrical operating body 36 is longitudinally slidably fitted over the outer-peripheral surface of the outer drive shaft 20 and the outer-peripheral surface of the cylindrical support body 28 and a proximal-end portion of a traveling clutch operating lever 37 is interlockingly connected with a rear portion of the traveling cylindrical operating body 36, while a clutch operating member 36*a* is mounted on a front-end peripheral portion of the traveling cylindrical operating body 36 and the clutch operating member 36*a* is arranged close to a motion receiving arm 21*a* of the traveling clutch 21 in a state that the clutch operating member 36*a* faces the motion receiving arm 21*a* of the traveling clutch 21 in an opposed manner. Numeral 38 is a lever support shaft.

In this manner, when the traveling clutch operating lever 37 is rotatably manipulated, the traveling cylindrical operating body 36 is allowed to slide in the forward direction and the clutch operating member 36*a* pushes the motion receiving arm 21*a* and the motion receiving arm 21*a* is rotated so as to allow the traveling clutch 21 to perform a power cutting operation.

Further, a PTO cylindrical operating body 39 is longitudinally slidably fitted on the outer-peripheral surface of the traveling cylindrical operating body 36 and a proximal-end portion of the PTO clutch operating lever 40 is interlockingly connected with the rear portion of the PTO cylindrical operating body 39, while a clutch operating member 39*a* is mounted on a front-end-peripheral portion of the PTO cylindrical operating body 39 and the clutch operating member 39*a* is arranged close to the motion receiving arm 22*a* of the PTO clutch 22 in a state that the clutch operating member 39*a* faces the motion receiving arm 22*a* of the PTO clutch 22 in an opposed manner. Numeral 41 is a lever support shaft.

In this manner, when the PTO clutch operating lever 40 is rotatably manipulated, the PTO cylindrical operating body 39 is allowed to slide in the forward direction and the clutch operating member 39a pushes the motion receiving arm 22a and the motion receiving arm 22a is rotated so as to allow the PTO clutch 22 to be performed a power cutting operation.

With respect to the transmission part 4, as shown in FIG. 2 and FIG. 3, in the inside of the transmission casing 45 which is formed in a cylindrical shape by extending the transmission casing 45 in the longitudinal direction, a main transmission mechanism 46, a sub transmission mechanism 47 and a differential mechanism 48 are sequentially arranged from front to back and, at the same time, a creep transmission part 49 is detachably mounted on the transmission casing 45 and a creep transmission mechanism 50 which is formed on the creep transmission part 49 is interlockingly connected with the above-mentioned sub transmission mechanism 47 thus forming a traveling-system power-transmission mechanism 51 which can perform the main transmission, the sub transmission and the creep transmission. Further, a PTO-system power-transmission mechanism 52 is interposed between the above-mentioned outer drive shaft 20 and a PTO transmission part 6 described later.

Then, the transmission casing 45 is split in two, that is, the main transmission casing 53 which incorporates the main transmission mechanism 46 and the casing body 54 which incorporates the sub transmission mechanism 47 and the differential mechanism 48. In the main transmission casing 53, a front-end-peripheral portion thereof is detachably connected with the rear-end-peripheral portion of the clutch housing 17 using a connection bolt 56a and, at the same time, in the casing body 54, a front-end-peripheral portion thereof is detachably connected with the rear-end-peripheral portion of the main transmission casing 53 by way of a support wall forming body 55 using a connection bolt 56b.

Here, the constitutions of the main transmission casing 53, the main transmission mechanism 46, the casing body 54, the sub transmission mechanism 47 and the differential mechanism 48 are explained in this order.

Main Transmission Casing

Figure 5:
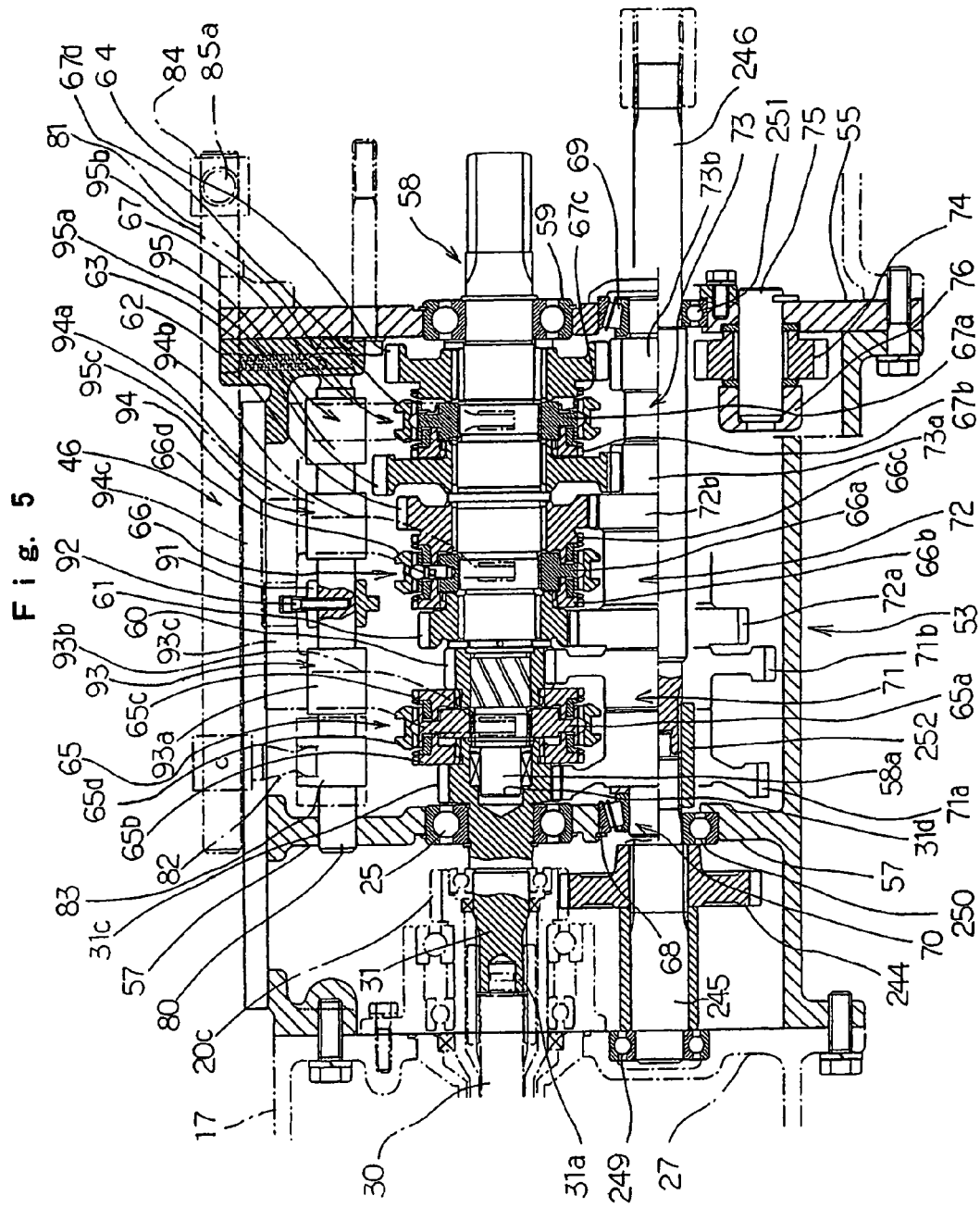
FIG. 5 is a cross-sectional explanatory side view of a main transmission part.
Figure 6:
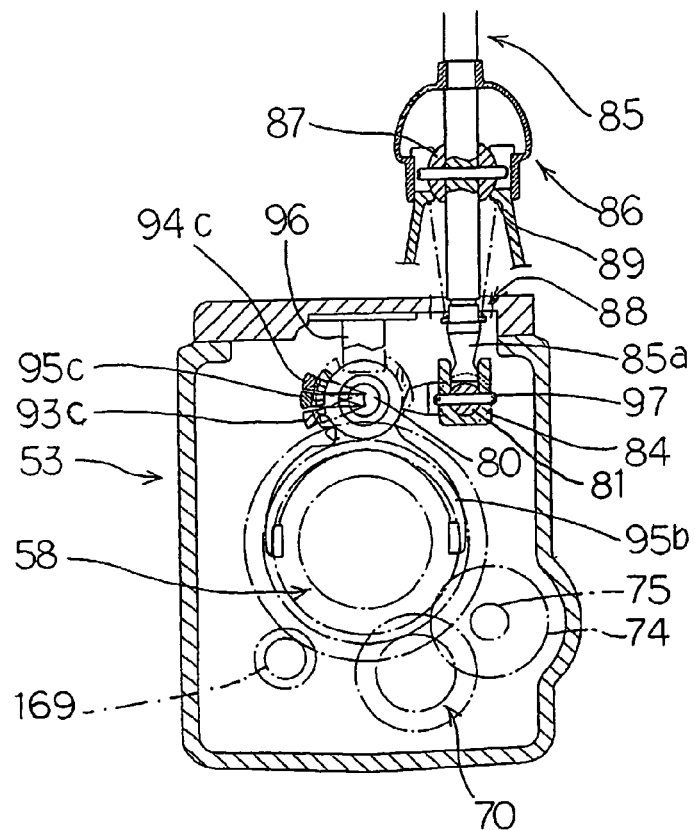
FIG. 6 is a cross-sectional explanatory back view of the main transmission part.

The main transmission casing 53 is, as shown in FIG. 5 and FIG. 6, formed in a cylindrical shape which extends in the longitudinal direction and an inner support wall 57 is formed on an inner-peripheral surface of the front portion thereof and interposes the main transmission mechanism 46 between the inner support wall 57 and the above-mentioned support wall forming body 55 thus enabling the advancing transmission manipulation and retracting changeover manipulation having plural stages (5 stages in this embodiment) by the main transmission mechanism 46.

Main Transmission Mechanism

In the main transmission mechanism 46, as shown in FIG. 5 and FIG. 6, a distal-end portion (rear-end portion) of the rear split drive shaft member 31 is supported on a center portion of the inner support wall 57 by way of the above-mentioned bearing 25. A fifth-speed gear 31c is integrally formed on an outer-peripheral surface of the distal-end portion of the rear split drive shaft member 31 which is positioned behind the bearing 25 and, at the same time, a distal-end-side fitting recessed portion 31d is formed on a rear-end surface of the rear split drive shaft member 31. A fitting projection member 58a which is projected in the more frontward direction than a proximal-end surface (front-end surface) of a main-transmission main shaft 58 which extends in the longitudinal direction is fitted in the distal-end-side fitting recessed portion 31d in a state that the fitting projection member 58a is rotatable about an axis thereof, while the distal-end portion (rear-end portion) of the main-transmission main shaft 58 is supported on the center portion of the support wall forming body 55 in a state that the distal-end portion of the main-transmission main shaft 58 is rotatable about an axis thereof by way of a bearing 59.

Then, on the main-transmission main shaft 58, fourth-speed, third-speed, second-speed and first-speed gears 60, 61, 62, 63 and a retracting changeover gear 64 are sequentially mounted from the proximal-end portion side to the distal-end portion side in a state that the fourth, third, second, first-speed gears 60, 61, 62, 63 and the retracting changeover gear 64 are arranged in a spaced-apart manner in the longitudinal direction coaxially and rotatably around the outer-peripheral surface of the main-transmission main shaft 58.

Further, on the main-transmission main shaft 58, a third transmission body 65 which is arranged between the fifth-speed gear 31c and the fourth-speed gear 60, a second transmission body 66 which is arranged between the third-speed gear 61 and the second-speed gear 62, and a first transmission body 67 which is arranged between the first-speed gear 63 and the retracting changeover gear 64 are mounted.

Here, the respective transmission bodies 65, 66, 67 include shaft-side interlocking connection members 65a, 66a, 67a which are interlockingly connected to the main-transmission main shaft 58, 58, front/rear-gear-side interlocking connection members 65b, 65c, 66b, 66c, 67b, 67c which are interlockingly connected with the respective neighboring gears in the fore-and-aft directions, and slide connection members 65d, 66d, 67d which are engaged by spline fitting in a slidable manner in the axial direction between the respective shaft-side interlocking connection members 65a, 66a, 67a and the respective gear-side interlocking connection members 65b, 65c, 66b, 66c, 67b, 67c.

Then, the respective slide connection members 65d, 66d, 67d are slidably manipulated to assume any one of a neutral position, a front slide transmission position and a rear slide transmission position. That is, at a neutral position, the respective slide connection members 65d, 66d, 67d are positioned on the respective shaft-side interlocking connection members 65a, 66a, 67a, at a front slide transmission position, the respective slide connection members 65d, 66d, 67d interlockingly connects the respective shaft-side interlocking connection members 65a, 66a, 67a and the front-gear-side interlocking connection members 65b, 66b, 67b after being slidably moved and are positioned between the shaft-side interlocking connection members 65a, 66a, 67a and the front-gear-side interlocking connection members 65b, 66b, 67b and, at a rear slide transmission position, the respective slide connection members 65d, 66d, 67d interlockingly connect the respective shaft-side interlocking connection members 65a, 66a, 67a and the rear-gear-side interlocking connection members 65c, 66c, 67c after being slidably moved and is positioned between the shaft-side interlocking connection members 65a, 66a, 67a and the rear-gear-side interlocking connection members 65c, 66c, 67c.

Further, a main transmission sub shaft 70 which extends in the longitudinal direction is supported between the inner support wall 57 and the above-mentioned support wall forming body 55 by way of the front/rear bearings 68, 69. First, second, third transmission gear bodies 71, 72, 73 are coaxially and rotatably mounted on the outer-peripheral surface of the main transmission sub shaft 70.

Further, a front gear 71a and a rear gear 71b which are integrally formed on the first transmission gear body 71 are meshed with the fifth-speed gear 31c and the second-speed gear 60 respectively. Further, a front gear 72a and a rear gear 72b which are integrally formed on the second transmission gear body 72 are meshed with the third-speed gear 61 and the second-speed gear 62 respectively. Further, a front gear 73a which is integrally formed on the third transmission gear body 73 is meshed with the first-speed gear 63, while a rear gear 73b which is integrally formed on the third transmission gear body 73 is meshed with the retracting changeover gear 64 by way of a counter gear 74 whose shaft is supported on the support wall forming body 55. Numeral 75 indicates a counter gear support shaft and numeral 76 indicates a shaft support body formed in the inside of the main transmission casing 53.

Figure 7:
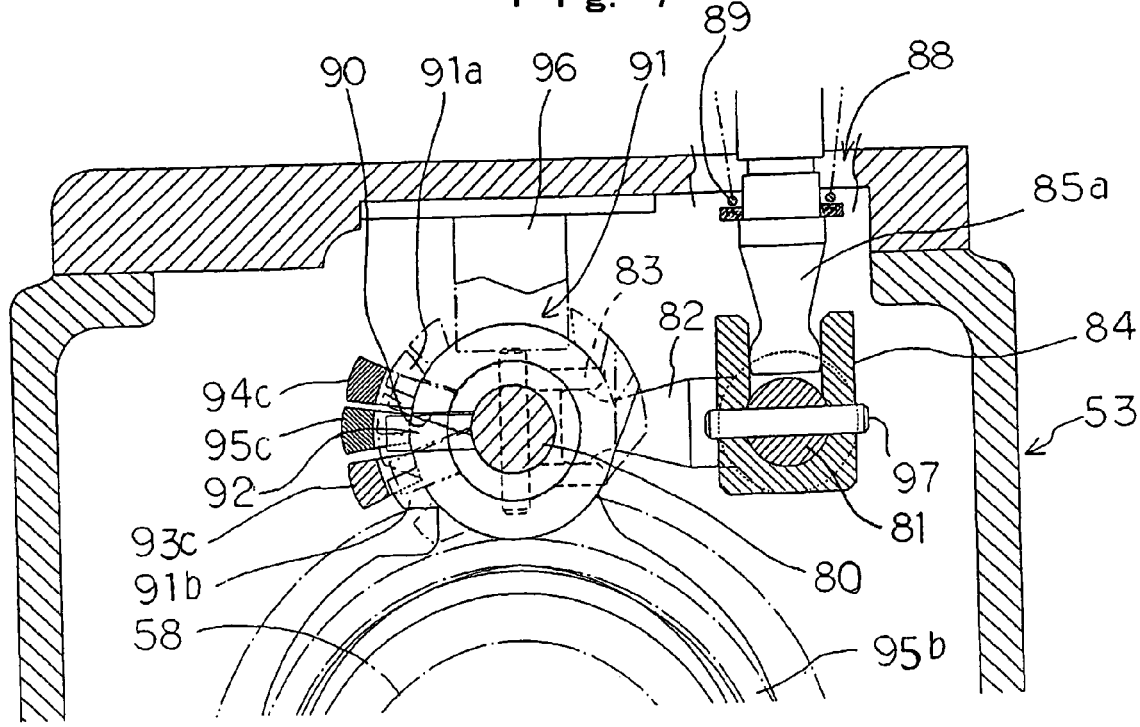
FIG. 7 is an enlarged cross-sectional explanatory back view of an upper portion of the main transmission part.

Still further, as shown in FIG. 5 to FIG. 7, a slide body support shaft 80 which extends in the longitudinal direction is extended between the inner support wall 57 and the above-mentioned support wall forming body 55 in a state that the slide body support shaft 80 is slidable in the longitudinal direction at a position right above the above-mentioned main-transmission main shaft 58 and, at the same time, a lever interlocking shaft 81 which extends in the longitudinal direction is extended in a state that the lever interlocking shaft 81 which extends in the longitudinal direction is made parallel with a right side position of the slide body support shaft 80 and slidable in the longitudinal direction. A distal-end portion of an engaging member 82 which is formed in a state that the engaging member 82 projects in the more leftward direction than the front portion of the lever interlocking shaft 81 is engaged with an engaging member 83 which is mounted on the front portion of the slide body support shaft 80, while an operation receiving member 84 is mounted on the rear-end portion of the lever interlocking shaft 81 which is extended to the inside of the casing body 54. An operation member 85a which is formed on the lower-end portion of the main transmission lever 85 is engaged with the operation receiving member 84. Numeral 97 indicates an operation-receiving member mounting pin.

Then, as shown in FIG. 2, a tilting support body 86 is mounted on a ceiling portion 54c of the casing body 54 and, as shown in FIG. 6, a lower portion of the main transmission lever 85 which extends in the vertical direction is supported on a tilting support member 87 mounted on the tilting support body 86 and hence, the main transmission lever 85 is allowed to be tiltably manipulated in the longitudinal and the lateral directions. A lower end of the operation member 85a which is formed on a lower-end portion of the main transmission lever 85 passes through the inside of a lever insertion hole 88 which is formed on the ceiling portion 54c and is engaged with the above-mentioned operation receiving member 84. Numeral 89 indicates a lever neutral restoring spring.

Further, as shown in FIG. 5 and FIG. 7, in a middle portion of the slide body support shaft 80, a slide restricting body 91 which is formed in a C-shape as viewed from back having a side opening portion 90 is fitted and, at the same time, a slide operation member 92 projects from the slide body support shaft 80 in the radial direction through the inside of the side opening portion 90.

Further, first, second, third slide bodies 95, 94, 93 are sequentially mounted on a slide body support shaft 80 from back to front in a state that the first, the second, the third slide bodies 95, 94, 93 are slidable in the axial direction and, at the same time, the third slide body 93 is arranged in front of the slide restricting body 91, while the first, the second slide bodies 95, 94 are arranged behind the slide restricting body 91.

Further, the respective slide bodies 95, 94, 93 are provided with boss portions 95a, 94a, 93a which are slidably fitted on the slide body support shaft 80, shift forks 95b, 94b, 93b which are formed in a state that the shift forks 95b, 94b, 93b are extended in the more downward direction on the left and right side than the respective boss portions 95a, 94a, 93a and slide operation receiving members 95c, 94c, 93c which are formed in a state that the slide operation receiving member 95c, 94c, 93c are extended from the respective boss portions 95a, 94a, 93a toward the slide restricting member 91.

Further, the respective shift forks 95b, 94b, 93b of the first, the second, the third slide bodies 95, 94, 93 are interlockingly connected with the slide connection members 67d, 66d, 65d of the above-mentioned first, second, third transmission bodies 67, 66, 65 respectively.

Further, in the respective slide operation receiving members 95c, 94c, 93c of the first, the second, the third slide bodies 95, 94, 93, the slide body support shaft 80 is rotated about an axis thereof so as to rotate the slide operation member 92 and the slide restricting body 91 in a given direction. Accordingly, the slide operation member 92 is engaged with one given slide operation receiving member and the slide operation receiving member is slidably operated interlockingly with the longitudinal slide of the slide body support shaft 80 and, at the same time, either one of restricting members 91a, 91b which are mounted on the slide restricting body 91 in a projecting manner is engaged with the other two slide operation receiving members and hence, it is possible to restrict both slide operation receiving members from being slidably operated interlockingly with the longitudinal slide of the slide body support shaft 80. Numeral 96 indicates a restricting projection member which is formed on the ceiling portion 54c of the casing body 54 in a suspended manner for restricting the movement of the slide restricting body 91 in the axial direction.

The main transmission mechanism 46 is constituted in the above-mentioned manner. The transmission manipulation (from first transmission manipulation to fifth transmission manipulation and retracting changeover manipulation) of the main transmission mechanism 46 is explained hereinafter.

(First Transmission Manipulation)

The main transmission lever 85 is rotatably manipulated in the rearward direction in an approximately vertically erected state and the rotary manipulation force is transmitted to the slide body support shaft 80 by way of the operation member 85a which is formed on a lower-end portion of the main transmission lever 85 →the operation receiving member 84 →the lever interlocking shaft 81→ the engaging member 82 →the engaging member 83 →the slide body support shaft 80 so as to allow the slide body support shaft 80 to slide in the frontward direction.

Accordingly, the sliding force of the slide body support shaft 80 in the frontward direction is transmitted to the shift fork 95b by way of the slide operation member 92 →the slide operation receiving member 95c of the first slide body 95 →the boss portion 95a and, thereafter, the slide connection member 67d of the first transmission body 67 which is interlockingly connected with the shift fork 95b is slid from the neutral position to the front slide transmission position thus establishing a state in which the shaft-side interlocking connection member 67a and the front-gear-side interlocking connection member 67b are interlockingly connected with each other.

As a result, the power transmitted from the engine 15 to the inner-side drive shaft 19 is transmitted to the main-transmission main shaft 58 by way of the front split drive shaft member 30 →the rear split drive shaft member 31→the fifth-speed gear 31c→the front gear 71a of the third transmission gear body 71→the main transmission sub shaft 70→the front gear 73a of the first transmission gear body 73→the first-speed gear 63→the front-gear-side interlocking connection member 67b of the first transmission body 67→the slide connection member 67d→the shaft-side interlocking connection member 67a→the main-transmission main shaft 58 thus performing the first transmission.

Here, the slide operation member 92 is engaged with the slide operation receiving member 95c of the first slide body 95 and, at the same time, the forming members 91a, 91b of the slide restricting body 91 are engaged with the slide operation receiving members 94c, 93c of the second, the third slide bodies 94, 93 so as to restrict the movement of both slide bodies 94, 93.

(Second Transmission Manipulation)

The main transmission lever 85 is rotatably manipulated in the rightward direction so as to rotate the operation member 85a which is formed on a lower-end portion of the main transmission lever 85 using the tilting support member 87 as a fulcrum in the leftward direction. The rotational force is transmitted to the slide body support shaft 80 by way of the operation receiving member 84→the lever interlocking shaft 81→the engaging member 82→the engaging member 83→the slide body support shaft 80 thus rotating the slide body support shaft 80 in the clockwise direction as viewed in a back view shown in FIG. 7, and, at the same time, rotating the slide restricting body 91 in the clockwise direction by way of the slide operation member 92.

Subsequently, the main transmission lever 85 which is rotatably manipulated in the rightward direction is further rotatably manipulated in the frontward direction so as to allow the slide body support shaft 80 to slide in the rearward direction.

Accordingly, the sliding force directed in the rearward direction of the slide body support shaft 80 is transmitted to the shift fork 94b by way of the slide operation member 92→the slide operation receiving member 94c of the second slide body 94→the boss portion 94a→the shift fork 94b so as to allow the slide connection member 66d of the second transmission body 66 which is interlockingly connected to the shift fork 94b to slide from the neutral position to the rear slide transmission position thus establishing a state in which the shaft-side interlocking connection member 66a and the rear-gear-side interlocking connection member 66c are interlockingly connected with each other.

As a result, the power which is transmitted from the engine 15 to the inner-side drive shaft 19 is transmitted to the main-transmission main shaft 58 by way of the front split drive shaft member 30→the rear split drive shaft member 31→the fifth-speed gear 31c→the front gear 71a of the third transmission gear body 71→the main transmission sub shaft 70→the rear gear 72b of the second transmission gear body 72→the second-speed gear 62→the rear-gear-side interlocking connection member 66c of the second transmission body 66→the slide connection member 66d→the shaft-side interlocking connection member 66a→the main-transmission main shaft 58 thus performing the second transmission.

Here, the slide operation member 92 is engaged with the slide operation receiving member 94c of the second slide body 94 and, at the same time, the restricting member 91b of the slide restricting body 91 is engaged with the slide operation receiving members 95c, 93c of the first and the third slide bodies 95, 93 so as to restrict the movement of both slide bodies 95, 93.

(Third Transmission Manipulation)

The main manipulation lever 85 is rotatably manipulated in the rightward direction and, at the same time, is rotatably manipulated in the rearward direction so as to allow the slide body support shaft 80 to slide in the front direction.

Accordingly, the sliding force directed to the frontward direction of the slide body support shaft 80 is transmitted to the shift fork 94b by way of the slide operation member 92→the slide operation receiving member 94c of the second slide body 94→the boss portion 94a→the shift fork 94b so as to allow the slide connection member 66d of the second transmission body 66 which is interlockingly connected to the shift fork 94b to slide from the neutral position to the front slide transmission position thus establishing a state in which the shaft-side interlocking connection member 66a and the front-gear-side interlocking connection member 66b are interlockingly connected with each other.

As a result, the power which is transmitted from the engine 15 to the inner-side drive shaft 19 is transmitted to the main-transmission main shaft 58 by way of the front split drive shaft member 30→the rear split drive shaft member 31→the fifth-speed gear 31c→the front gear 71a of the first transmission gear body 71→the main transmission sub shaft 70→the front gear 72a of the second transmission gear body 72→the third-speed gear 61→the front-gear-side interlocking connection member 66b of the second transmission body 66→the slide connection member 66d→the shaft-side interlocking connection member 66a→the main-transmission main shaft 58 thus performing the third transmission.

Here, the slide operation member 92 is engaged with the slide operation receiving member 94c of the second slide body 94 and, at the same time, the restricting member 91b of the slide restricting body 91 is engaged with the slide operation receiving members 95c, 93c of the first and the third slide bodies 95, 93 so as to restrict the movement of both slide bodies 95, 93.

(Fourth Transmission Manipulation)

The main transmission lever 85 is rotatably manipulated in the leftward direction so as to rotate the operation member 85a which is formed on the lower-end portion of the main transmission lever 85 using the tilting support member 87 as a fulcrum in the rightward direction. The rotational force is transmitted to the slide body support shaft 80 by way of the operation receiving member 84→the lever interlocking shaft 81→the engaging member 82→the engaging member 83→the slide body support shaft 80 thus rotating the slide body support shaft 80 in the counterclockwise direction as viewed in the back view shown in FIG. 7, and, at the same time, rotating the slide restricting body 91 in the counter-clockwise direction by way of the slide operation member 92.

Subsequently, the main transmission lever 85 which is rotatably manipulated in the rightward direction is further rotatably manipulated in the frontward direction so as to allow the slide body support shaft 80 to slide in the rearward direction.

Accordingly, the sliding force directed in the rearward direction of the slide body support shaft 80 is transmitted to the shift fork 93b by way of the slide operation member 92→the slide operation receiving member 93c of the third slide body 93→the boss portion 93a→the shift fork 93b so as to allow the slide connection member 65d of the third transmission body 65 which is interlockingly connected to the shift fork 93b to slide from the neutral position to the rear slide transmission position thus establishing a state in which the shaft-side interlocking connection member 65a and the rear-gear-side interlocking connection member 65c are interlockingly connected with each other.

As a result, the power which is transmitted from the engine 15 to the inner-side drive shaft 19 is transmitted to the main-transmission main shaft 58 by way of the front split drive shaft member 30→the rear split drive shaft member 31→the fifth-speed gear 31c→the rear gear 71b of the third transmission gear body 71→the fourth-speed gear 62→the rear-gear-side interlocking connection member 65c of the third transmission body 65→the slide connection member 65d→the shaft-side interlocking connection member 65a→the main-transmission main shaft 58 thus performing the fourth transmission.

Here, the slide operation member 92 is engaged with the slide operation receiving member 93c of the third slide body 93 and, at the same time, the restricting member 91a of the slide restricting body 91 is engaged with the slide operation receiving members 95c, 94c of the first and the second slide bodies 95, 94 so as to restrict the movement of both slide bodies 95, 94.

(Fifth Transmission Manipulation)

The main manipulation lever 85 is rotatably manipulated in the leftward direction and, at the same time, is rotatably manipulated in the rearward direction so as to allow the slide body support shaft 80 to slide in the frontward direction.

Accordingly, the sliding force directed to the frontward direction of the slide body support shaft 80 is transmitted to the shift fork 95b by way of the slide operation member 92→the slide operation receiving member 95c of the third slide body 95→the boss portion 95a→the shift fork 95b so as to allow the slide connection member 67d of the third transmission body 67 which is interlockingly connected to the shift fork 95b to slide from the neutral position to the front slide transmission position thus establishing a state in which the shaft-side interlocking connection member 67a and the front-gear-side interlocking connection member 67b are interlockingly connected with each other.

As a result, the power which is transmitted from the engine 15 to the inner-side drive shaft 19 is transmitted to the main-transmission main shaft 58 by way of the front split drive shaft member 30→the rear split drive shaft member 31→the fifth-speed gear 31c→the front-gear-side interlocking connection member 65b of the third transmission gear body 67→the slide connection member 67d→the shaft-side interlocking connection member 65a→the main-transmission main shaft 58 thus performing the fifth transmission.

Here, the slide operation member 92 is engaged with the slide operation receiving member 93c of the third slide body 93 and, at the same time, the restricting member 91a of the slide restricting body 91 is engaged with the slide operation receiving members 95c, 94c of the first and the second slide bodies 95, 94 so as to restrict the movement of both slide bodies 95, 94.

(Backward Motion Changeover Manipulation)

The main transmission lever 85 is rotatably manipulated in the frontward direction in an approximately vertically erected state and the rotary manipulation force is transmitted to the slide body support shaft 80 by way of the operation member 85a which is formed on a lower-end portion of the main transmission lever 85→the operation receiving member 84→the lever interlocking shaft 81→the engaging member 82→the engaging member 83→the slide body support shaft 80 so as to allow the slide body support shaft 80 to slide in the rearward direction.

Accordingly, the sliding force of the slide body support shaft 80 in the rearward direction is transmitted to the shift fork 95b by way of the slide operation member 92→the slide operation receiving member 95c of the third slide body 95→the boss portion 95a→the shift fork 95b and, thereafter, the slide connection member 67d of the first transmission body 67 which is interlockingly connected with the shift fork 95b is slid from the neutral position to the rear slide transmission position thus establishing a state in which the shaft-side interlocking connection member 67a and the rear-gear-side interlocking connection member 67c are interlockingly connected with each other.

As a result, the power transmitted from the engine 15 to the inner-side drive shaft 19 is transmitted to the main-transmission main shaft 58 by way of the front split drive shaft member 30→the rear split drive shaft member 31→the fifth-speed gear 31c→the front gear 71a of the third transmission gear body 71→the main transmission sub shaft 70→the rear gear 73b of the first transmission gear body 73→the counter gear 74→the backward motion changeover gear 64→the rear-gear-side interlockingly connection member 67c of the third transmission body 67→the slide connection member 67d→the shaft-side interlocking connection member 67a→the main-transmission main shaft 58 and hence, the main-transmission main shaft 58 is rotated reversely thus performing the backward motion changeover.

Here, the slide operation member 92 is engaged with the slide operation receiving member 95c of the first slide body 95 and, at the same time, the forming members 91a, 91b of the slide restricting body 91 are engaged with the slide operation receiving members 94c, 93c of the second, the third slide bodies 94, 93 so as to restrict the movement of both slide bodies 94, 93.

Casing Body

Figure 8:
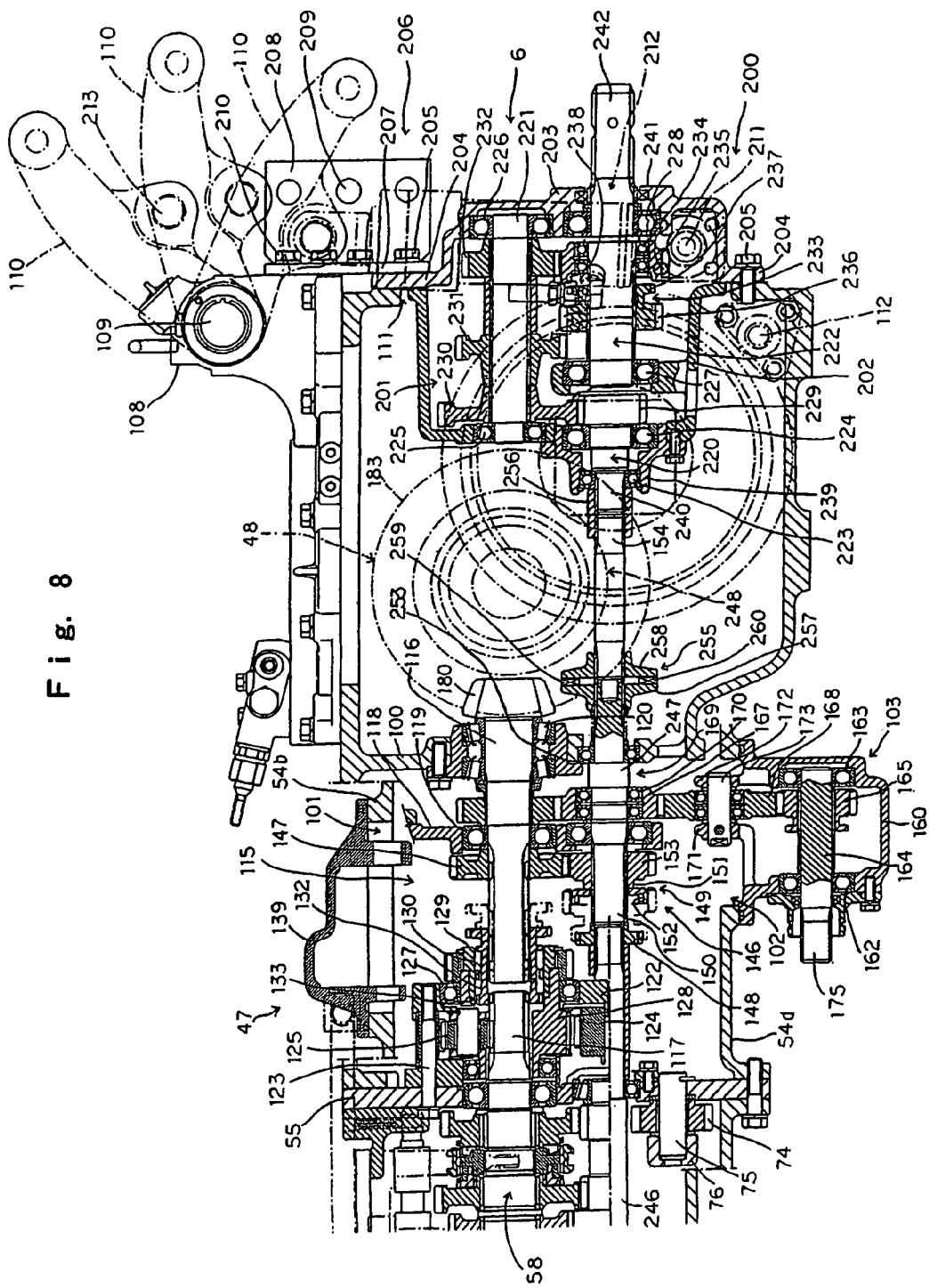
FIG. 8 is a cross-sectional explanatory side view of a sub transmission part and a PTO transmission part.
Figure 11:
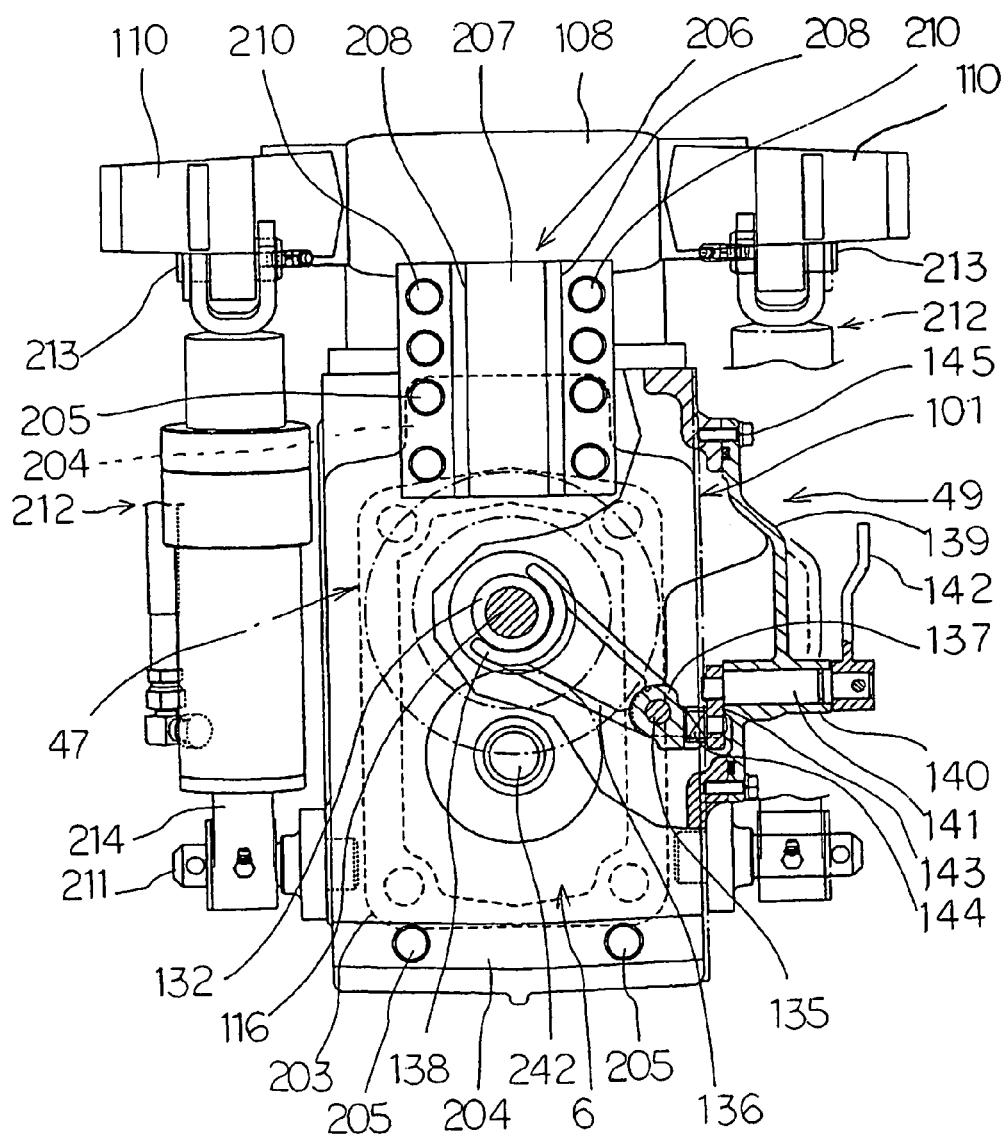
FIG. 11 is a back view with a part broken away of the PTO transmission part.

The casing body 54 is, as shown in FIG. 2, FIG. 8 and FIG. 11, is formed in a cylindrical shape extending in the longitudinal direction, wherein a shaft support wall 100 is formed on a middle portion of an inner peripheral surface. In the inside of the casing body 54, the sub transmission mechanism 47 is arranged at a position in front of the above-mentioned shaft support wall 100 and, at the same time, a differential mechanism 48 is arranged at a position behind the shaft support wall 100.

Further, with respect to the casing body 54 which is positioned in front of the shaft support wall 100, an opening portion 101 is formed in the right side wall 54b, the creep transmission part 49 described later is detachably mounted by way of the opening portion 101, an opening portion 102 is formed in a bottom portion 54d, and a front-wheel-driving power take out part 103 described later is mounted by way of the opening portion 102, and the creep transmission part 49 and the front-wheel-driving power take out part 103 are respectively interlockingly connected with the sub transmission mechanism 47.

Figure 9:
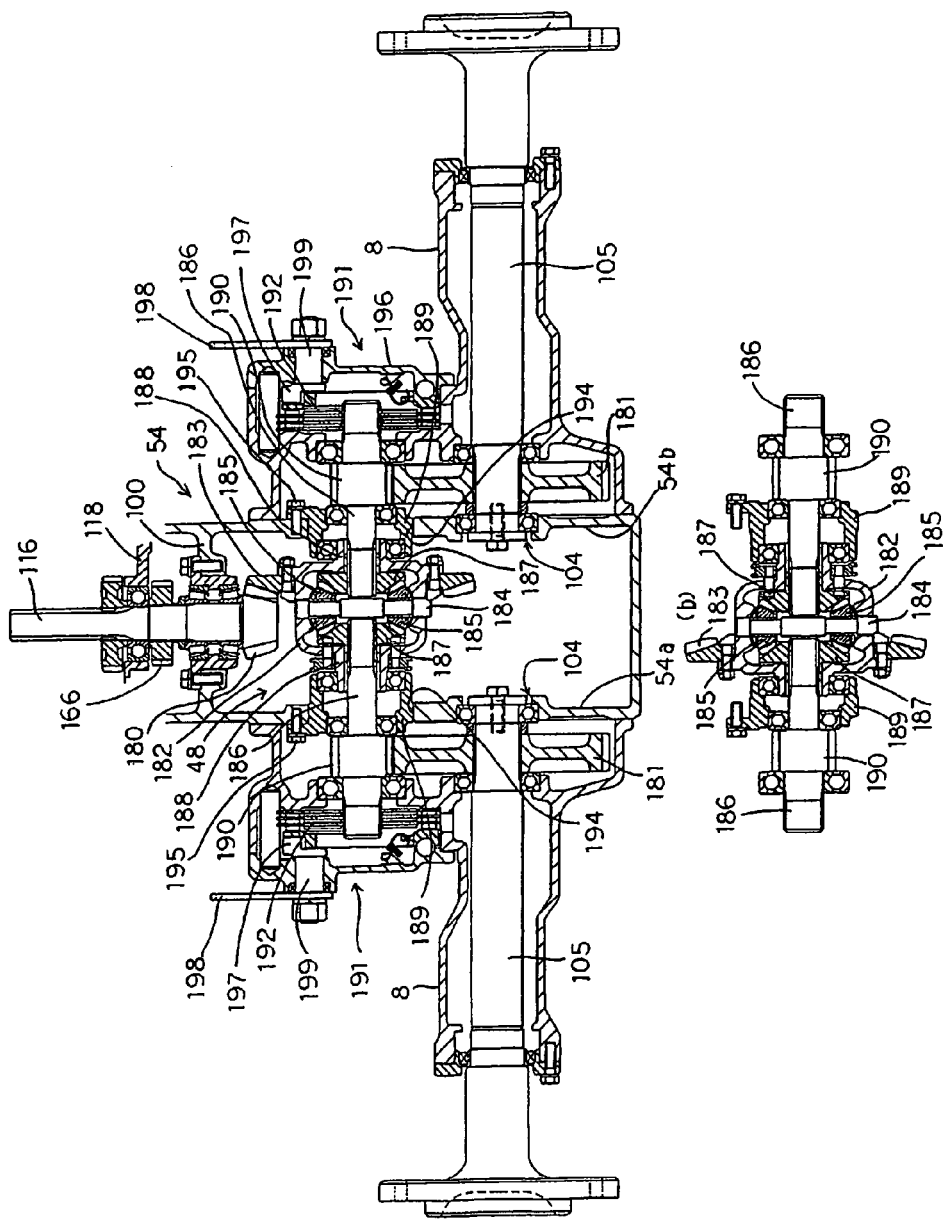
FIG. 9 is a cross-sectional plan explanatory view of a differential mechanism.

Further, in the casing body 54 which is positioned behind the shaft support wall 100, as shown in FIG. 9, opening portions 104, 104 are respectively formed in left and right side walls 54a, 54b, the rear axle casings 8, 8 are communicably connected with each other by way of the respective opening portions 104, 104, rear axles 105, 105 which extend in the lateral direction are inserted into and are rotatably supported on the respective rear axle casings 8, 8, and the respective rear axles 105, 105 are interlockingly connected with the differential mechanism 48.

Further, with respect to the casing body 54 which is positioned behind a shaft support wall 100, as shown in FIG. 8, an opening portion 106 for maintenance is formed in a ceiling portion of the casing body 54 and the opening portion 106 is closed by a detachable lid body 107. A lift arm support body 108 is formed in an upwardly bulging manner on a rear portion of the lid body 107, a lift arm support shaft 109 which has an axis thereof directed in the lateral direction is inserted in and is rotatably supported on an upper portion of the lift arm support body 108, and proximal end portions of a pair of left and right lift arms 110, 110 are mounted on left and right side end portions of the lift arm support shaft 109.

Further, as shown in FIG. 8, the PTO transmission part 6 is mounted in an opening 111 formed in a rear end of the casing body 54.

Further, as shown in FIG. 2 and FIG. 8, on rear lower portions of the left and right side walls of the casing body 54, lower link connection pins 112, 112 are formed in a state that the lower link connection pins 112, 112 project outwardly, wherein front end portions of the pair of left and right lower links 13, 13 are rotatably supported on the casing body 54 by way of the lower link connection pins 112, 112.

Sub Transmission Mechanism

In the sub transmission mechanism 47, as shown in FIG. 8, a sub transmission shaft 116 is interlockingly connected with a distal end portion (rear end portion) of the above-mentioned main-transmission main shaft 58 by way of a planetary gear mechanism 115, and a distal end portion of the main-transmission main shaft 58 is extended rearwardly and forms a sun gear 117 which constitutes a portion of a planetary gear mechanism 115. On the other hand, a sub transmission shaft 116 is arranged coaxially with the main-transmission main shaft 58, has a middle portion thereof supported on a shaft support body 118 formed in the inside of the casing body 54 by way of the bearing 119, and a distal end portion thereof supported on the above-mentioned shaft support wall 100 by way of the bearing 120.

The planetary gear mechanism 115 is constituted as follows. A pair of front and rear inner gear support bodies 121, 122 which are formed in a ring shape and are arranged around an outer periphery of the sun gear 117 are mounted on the above-mentioned support wall forming body 55 using mounting bolts 123 which have a longitudinally extending axis. An inner gear 124 is supported between both inner gear support bodies 121, 122 in a state that both ends of the inner gear 124 are supported by both inner gear support bodies 121, 122. A plurality of planetary gears 125 are arranged in the circumferential direction of the inner gear 124 in a spaced-apart manner and, at the same time, the respective planetary gears 125 are meshed with both of the inner gear 124 and the sun gear 117. A carrier 128 is mounted between inner peripheral portions of a pair of front and rear inner gear support bodies 121, 122 by way of a pair of front and rear bearings 126, 127, and the plurality of planetary gears 125 are integrally and interlockingly connected with the carrier 128.

Further, the carrier 128 has a rear-end peripheral portion thereof extended in the more rearward direction than the bearing 127 positioned behind the carrier 128 and forms a cylindrical gear forming member 129 and the inner teeth 130 are formed on the inner-peripheral surface of the gear forming member 129.

Still further, a cylindrical shift gear support body 132 is fitted between the outer peripheral surface of the sun gear 117 and the outer peripheral surface of the proximal-end portion (front end portion) 114 of the sub transmission shaft 116 in a shiftable manner in the axial direction by spline fitting and a front shift gear 133 is integrally formed on the front outer peripheral surface of the shift gear support body 132 and, at the same time, a rear shift gear 134 is integrally formed on the rear outer peripheral surface.

Figure 10:
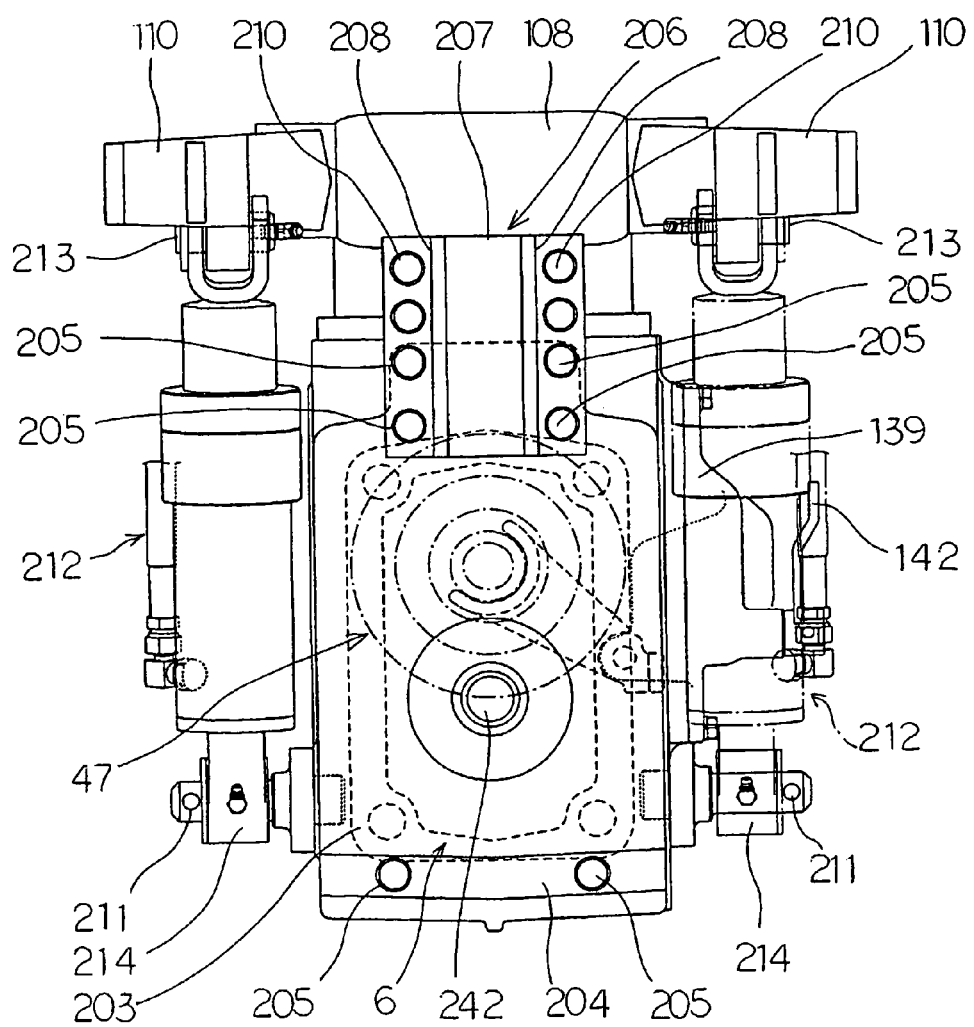
FIG. 10 is a back view of a PTO transmission part.

Then, as shown in FIG. 10 and FIG. 11, a fork support shaft 135 whose axis is directed in the longitudinal direction is arranged on the right side in the inside of the casing body 54 and a proximal-end portion 137 of a shift fork 136 is longitudinally slidably mounted on the fork support shaft 135 and, at the same time, a distal-end portion 138 of the shift fork 136 is engaged with the shift gear support body 132.

Further, an opening portion 111 is formed in a right side wall of the casing body 54, a lid body 139 is detachably mounted on the opening portion 111, a boss portion 140 which has an axis thereof directed in the lateral direction is formed on the lid body 139, a lever support shaft 141 is inserted into the boss portion 140, a proximal end portion of the sub transmission lever 142 is mounted on an outer end portion of the lever support shaft 141, a proximal end portion of an interlocking arm 143 is mounted on an inner end portion of the lever support shaft 141, and a proximal end portion 137 of the above-mentioned shift fork 136 is connected to a distal end portion of the interlocking arm 143 by way of a block 144.

Due to such a constitution, by rotatably manipulating the sub transmission lever 142 in the longitudinal direction, the shift gear support body 132 is shifted in the longitudinal direction so as to perform the sub transmission manipulation.

That is, when the sub transmission lever 142 is rotated in the rearward direction, the interlocking arm 143 is rotated in the frontward direction by way of the lever support shaft 141 and the shift fork 136 which is connected to a distal-end portion of the interlocking arm 143 by way of the block 144 is slid in the frontward direction and hence, the shift gear support body 132 which is engaged with the shift fork 136 is shifted in the frontward direction.

At this time, the shift gear support body 132 is shifted in a state that the shift gear support body 132 is extended between an outer peripheral surface of the sun gear 117 and an outer peripheral surface of the proximal-end portion (front-end portion) 114 of the sub transmission shaft 116 thus providing a state in which the sun gear 117 and the sub transmission shaft 116 are interlockingly connected with each other by way of the shift gear support body 132 (a state in which the main-transmission main shaft 58 and the sub transmission shaft 116 are directly connected with each other).

Accordingly, in such a shift position, the power is transmitted from the sun gear 117 which is integrally formed on the main-transmission main shaft 58 to the sub transmission shaft 116 by way of the shift gear support body 132.

Further, when the sub transmission lever 142 is rotated in the frontward direction, the interlocking arm 143 is rotated in the rearward direction by way of the lever support shaft 141 and the shift fork 136 which is connected to the distal-end portion of the interlocking arm 143 by way of the block 144 is slid in the rearward direction and hence, the shift gear support body 132 which is engaged with the shift fork 136 is shifted in the rearward direction.

Then, the shift gear support body 132 is detached from the outer peripheral surface of the sun gear 117 and is shifted on the outer peripheral surface of the proximal-end portion (front-end portion) 144 of the sub transmission shaft 116 and, at the same time, the front shift gear 133 is meshed with the inner teeth 130 which are formed on the inner peripheral surface of the gear forming member 129.

Accordingly, in such a shift position, rotation power of the sun gear 117 which is integrally formed on the main-transmission main shaft 58 is transmitted to the proximal-end portion 114 of the sub transmission shaft 116 by way of the planetary gear 125 which is meshed with the sun gear 117→the carrier 128→the inner teeth 130 of the gear forming member 129 which is integrally formed on the carrier 128→the front shift gear 133 of the shift gear support body 132 the shift gear support body 132→the proximal-end portion 114 of the sub transmission shaft 116.

At this time, the decelerated power is transmitted from the main-transmission main shaft 58 to the sub transmission shaft 116 by way of the planetary gear mechanism 115 so as to perform the sub transmission.

A front-wheel-drive power takeout portion 103 is configured such that, as shown in FIG. 2 and FIG. 8, a takeout portion casing 160 is mounted on an opening portion 102 formed on a bottom portion of the casing body 54 using mounting bolts 161, a front wheel drive shaft 164 which has an axis thereof directed in the longitudinal direction is extended in the inside of the takeout portion casing 160 by way of a pair of front and rear bearings 162, 163, an input gear 165 is mounted on a middle portion of the front wheel drive shaft 164, and first and second intermediate gears 167, 168 are interposed between the input gear 165 and the sub transmission shaft 116.

Here, the first intermediate gear 167 is rotatably mounted on a PTO-system power transmission shaft 169 described later by way of a bearing 170 and, at the same time, the second intermediate gear 168 is rotatably mounted on a gear support shaft 173 by way of a bearing 174, wherein the gear support shaft 173 is extended between a pair of front and rear gear support members 171, 172 which are formed in a state that the gear support members 171, 172 project toward the inside of the casing body 54.

Further, the output gear 166, the first intermediate gear 167, the second intermediate gear 168 and the input gear 165 are interlockingly connected with each other by allowing these gears to be meshed with each other in series.

Further, the front wheel drive shaft 164 has a distal-end portion 175 thereof projected frontwardly from the takeout portion casing 160 and the distal end portion 175 thereof interlockingly connected with an input shaft (not shown in the drawing) provided to a front axle casing by way of a power transmission shaft or the like.

In this manner, a rotational force of the sub transmission shaft 116 is transmitted to the front wheels 7, 7 by way of the output gear 166 mounted on the sub transmission shaft 116→the first intermediate gear 167→the second intermediate gear 168→the input gear 165→the front wheel drive shaft 164→the power transmission shaft and the like→the input shaft→the front axle→the front wheels 7, 7 thus enabling the four-wheel drive traveling.

Further, in this embodiment, the input gear 165 is engaged with a middle portion of the front wheel drive shaft 164 by spline fitting, wherein the input gear 165 is shiftable between a position at which the input gear 165 is meshed with the second intermediate gear 168 and a position at which such meshing is released and, at the same time, the shifting manipulation of the input shaft 165 is performed from the outside of the takeout part casing 160 using a shift manipulation mechanism (not shown in the drawing).

By performing the shifting manipulation which allows the input gear 165 to be meshed with the second intermediate gear 168 in this manner, it is possible to perform the four-wheel drive traveling as described above and, at the same time, by performing the shifting manipulation which releases the meshing of the input gear 165 with the second intermediate gear 168, it is possible to perform the two wheel drive traveling which drives only the rear wheels whereby it is possible to efficiently perform a work by suitably performing the changeover manipulation of the four-wheel drive traveling and the two-wheel drive traveling corresponding to the work condition.

Differential Mechanism

The differential mechanism 48 is, as shown in FIG. 8 and FIG. 9, interposed between the above-mentioned sub transmission shaft 116 and the pair of left and right rear axles 105, 105, wherein on a distal-end portion (a rear-end portion) of the sub transmission shaft 116 which is extended rearwardly than the shaft support wall 100, an output bevel gear 180 is integrally formed, while rear axle input gears 181, 181 are mounted on proximal end portions of respective rear axles 105, 105, and the output bevel gear 180 is interlockingly connected with the respective rear axle input gears 181, 181 by way of the differential mechanism 48.

That is, the differential mechanism 48 is configured such that a large deceleration gear 183 which is meshed with the above-mentioned output bevel gear 180 is mounted on an outer peripheral surface of the differential casing 182, while in the inside of the differential casing 182, a pair of front and rear small differential gears 185, 185 are rotatably mounted by way of a small differential gear support shaft 184 which extends longitudinally and, at the same time, a pair of left and right large differential gears 187, 187 are mounted by way of a pair of large differential gear support shafts 186, 186 which extend in the lateral direction, and the respective large differential gears 187, 187 are meshed with both small differential gears 185, 185.

Further, in cylindrical communication connecting members 188, 188 which are integrally formed with left and right side portions of the differential casing 182, a pair of left and right cylindrical shaft support bodies 189, 189 which direct axes thereof in the lateral direction are detachably fitted in a state that the cylindrical shaft support bodies 189, 189 are communicably connected with each other. In the inside of the respective cylindrical shaft support bodies 189, 189 which are allowed to pass through the respective cylindrical communication connecting members 188, 188, the above-mentioned large differential gear support shafts 186, 186 are inserted and supported. On portions of the respective large differential gear support shafts 186, 186 which project from the cylindrical shaft support bodies 189, 189, power transmission gears 190, 190 which are respectively meshed with the above-mentioned rear axle input gears 181, 181 are mounted. Further, distal end portions of the respective large differential gear support shafts 186, 186 are detachably connected with traveling brakes 192, 192 of brake portions 191, 191 described later.

In this manner, a rotational force which is transmitted to the sub transmission shaft 116 is transmitted to the respective rear wheels 9, 9 by way of the output bevel gear 180 which is integrally formed with the distal-end portion (rear-end portion) of the sub transmission shaft 116→the large deceleration gear 183→the differential casing 182→the small differential gear support shaft 184→the respective small differential gears 185, 185→the respective large differential gears 187, 187→the respective large differential gear support shafts 186, 186→the respective power transmission gears 190, 190→the respective rear axle input gears 181, 181→the respective rear axles 105, 105→the respective rear wheels 9, 9.

Further, the pair of left and right cylindrical shaft support bodies 189, 189 are fitted into mounting opening portions 194, 194 which are formed in left and right side walls 54a, 54b of the casing body 54 from the outside and, at the same time, the cylindrical shaft support bodies 189, 189 are detachably mounted on the left and right side walls 54a, 54b using mounting bolts 195, 195, while the differential casing 182 is detachably extended between both cylindrical shaft support bodies 189, 189.

Further, by pulling out the respective cylindrical shaft support bodies 189, 189 from the mounting opening portions 194, 194 to the outside after removing the mounting bolts 195, 195, it is possible to remove the respective cylindrical shaft support bodies 189, 189 from the casing body 54. In such an operation, it is also possible to remove the respective large differential gear support shafts 186, 186 by pulling out the respective large differential gear support shafts 186, 186 from the differential casing 182 integrally with the respective cylindrical shaft support bodies 189, 189.

Accordingly, the differential casing 182 which is detachably extended between both cylindrical shaft support bodies 189, 189 can be, after removing the respective cylindrical shaft support bodies 189, 189, taken out from the opening portion 106 for maintenance which is formed in the ceiling portion of the casing body 54.

Further, in the brake portion 191, a traveling brake 192 is arranged in the inside of a brake casing 196, and the traveling brake 192 performs the braking/releasing by manipulation of a brake manipulation lever 198 by way of a brake operation member 197. Numeral 199 indicates a brake lever support shaft which is pivotally supported on the brake casing 196.

Then, the brake casing 196 is detachably mounted between a side wall of the casing body 54 and a base portion of an outer peripheral surface of the rear axle casing 8 in a state that the brake casing 196 is extended therebetween. By removing the brake casing 196 from the casing body 54 and the rear axle casing 8, it is possible to remove the traveling brake 192 from a distal-end portion of the large differential gear support shaft 186 integrally with the brake casing 196.

In this manner, the differential mechanism 48 can selectively adopt either one of a mounting mode in which, as shown in FIG. 9(*a*), the large reduction gear 183 is meshed with the output bevel gear 180 from the right side and the mounting mode in which, as shown in FIG. 9(*b*), the large speed-reduction gear 183 is meshed with the output bevel gear 180 from the left side in a state that the differential mechanism 48 is vertically reversed to change over left and right portions of the differential mechanism 48.

Accordingly, corresponding to a working machine which is connected to the tractor A or an operation form, the advancing direction (main operation direction) of the tractor A can be easily changed by selecting the mounting form of the differential mechanism 48.

Next, the constitution of the PTO transmission part 6 is explained with reference to FIG. 8, FIG. 10 and FIG. 11.

That is, in the PTO transmission part 6, as shown in FIG. 8, FIG. 10 and FIG. 11, a PTO casing 200 is detachably mounted in the opening portion 111 which is formed in the rear end of the casing body 54 and a PTO transmission mechanism 201 is arranged in the inside of the PTO casing 200.

Then, the PTO casing 200 is formed of a front case forming body 202 which is arranged in the inside of the casing body 54 in an accommodated manner and a rear casing forming body 203 which is arranged in an expanding manner in the rearward direction from the casing body 54. A flange-like mounting member 204 is integrally formed on the front-end peripheral portion of the rear casing forming body 203 and the mounting member 204 is brought into contact with the rear-end peripheral portion of the casing body 54 from behind and, at the same time, is mounted on the rear-end peripheral portion of the casing body 54 by a mounting bolt 205 whose axis is directed in the longitudinal direction.

In this manner, since the PTO casing 200 is detachably mounted in the opening portion 111 which is formed in the rear end of the casing body 54, it is possible to easily perform the assembling operation and the maintenance operation of the PTO transmission mechanism 201 which is accommodated in the inside of the PTO casing 200.

Here, a top link stay 206 for pivotally supporting and connecting a front-end portion of the top link 12 is mounted between a rear portion of the above-mentioned lift arm support body 108 and an upper portion of a rear-end peripheral portion of the casing body 54. The top link stay 206 is formed of a plate-like mounting seat 207 whose surface is brought into contact with the rear portion of the lift arm support body 108 and the upper portion of the rear-end peripheral portion of the casing body 54 and is to be mounted using a mounting bolt 210 and a pair of left and right plate-like pivotally-supporting/connecting members 208, 208 which are formed in a state that the pivotally-supporting/connecting members 208, 208 project in the more rearward direction than the rear surface of the mounting seat 207. Numeral 209 indicates a connection hole.

Then, the lower portion of the mounting seat 207 is brought into contact with and is overlapped to the mounting member 204 of the rear casing forming body 203 from behind and, at the same time, the lower portion of the mounting seat 207 and the mounting member 204 of the rear casing forming body 203 are fastened together using a mounting bolt 205.

Further, lift cylinder support shafts 211, 211 as lift cylinder mounting portions are formed on left and right side walls of the rear casing forming body 203 in a state that the lift cylinder support shafts 211, 211 project toward the outside. Lift cylinders 212, 212 which are extended or contracted in the vertical direction are disposed between the respective lift cylinder support shafts 211, 211 and middle portions of the above-mentioned lift arms 110, 110. Numeral 213 indicates a lift cylinder connection pin and numeral 214 indicates a lift cylinder pivotally-supporting connection member.

In this manner, a pair of left and right lift cylinders 212, 212 which are operated in a vertically stretching manner are arranged at left and right side positions of the rear casing forming body 203 and, at the same time, the lower-end portions of the respective lift cylinders 212, 212 are supported on the rear casing forming body 203 by way of the lint cylinder support shafts 211, 211 and hence, it is possible to facilitate to set positions of both of the lift cylinders 212, 212 arranged vertically or approximately vertically. Accordingly, strokes of the respective lift cylinders 212,212 can be made small and hence, it is possible to make the sizes of the respective lift cylinders 212, 212 small and, besides, it is possible to reduce the power loss.

Further, since the lower-end portions of the respective lift cylinders 212, 212 are supported on the rear casing forming body 203 by way of the lift cylinder support shafts 211, 211, it is possible to firmly support the respective lift cylinders 212, 212.

Further, for example, by reducing the width in the lateral direction of the rear casing forming body 203 and arranging the pair of left and right lift cylinders 212, 212 at the left and right side positions of the rear casing forming body 203 and, at the same time, arranging the pair of left and right lift cylinders 212, 212 within the width in the lateral direction of the casing body 54, it is possible to increase the flexibility of the mounting position of a vertically movable link mechanism on the casing body 54.

Next, to explain the PTO transmission mechanism 201, in the PTO transmission mechanism 201, as shown in FIG. 8, an input shaft 220, a transmission shaft 221 and a PTO shaft 222 whose axes are directed in the longitudinal direction are rotatably supported in the inside of the PTO casing 200 by way of bearings 223, 224, 225,226, 227, 228 respectively. The input shaft 220 has a distal-end portion 240 thereof projected in the frontward direction from an input shaft projection portion 239 which is formed on a front wall of the PTO casing 200, while the PTO shaft 222 has a distal-end portion 242 thereof projected in the rearward direction from a PTO shaft projection portion 241 which is formed on a rear wall of the PTO casing 200.

Then, an output gear 229 is formed on the input shaft 220, while a large-diameter input gear 230, a first transmission gear 231 and a second transmission gear 232 are coaxially mounted on the transmission shaft 221 and the above-mentioned large-diameter input gear 230 is meshed with the above-mentioned output gear 229.

Further, a shift gear body 233 is fitted on the PTO shaft 222 by spline fitting in a state that the shift gear body 233 is slidable in a shiftable manner in the axial direction and, at the same time, an input gear 235 is rotatably mounted on the PTO shaft 222 by way of a bearing 234 and a large-diameter shift gear 236 and a small-diameter shift gear 237 are mounted on the shift gear body 233, while a fitting-and-meshing gear 238 is formed on a front surface of the input gear 235 in a state that the above-mentioned small-diameter shift gear 237 is fitted in and meshed with the fitting-and-meshing gear 238.

Due to such a constitution, by shifting the shift gear 233 using the PTO transmission manipulation mechanism not shown in the drawing, it is possible to perform the first PTO transmission manipulation which allows the large-diameter shift gear 236 to be meshed with the above-mentioned first transmission gear 231 and the second PTO transmission manipulation which allows the small-diameter shift gear 237 to be fitted in and meshed with the fitting and meshing gear 238.

Further, the PTO-system power transmission mechanism 52 is constituted, as shown in FIG. 3, by interlockingly connecting a distal end portion 240 of the input shaft 220 to the above-mentioned outer drive shaft 20 by way of the PTO-system power transmission shaft 169. A changeover mechanism 146 is interposed between the PTO-system power transmission mechanism 52 and the above-mentioned traveling-system power transmission mechanism 51, wherein with the use of the changeover mechanism 146, it is possible to perform the changeover manipulation which interrupts the power transmission of the PTO-system power transmission mechanism 52 in a middle portion thereof and, at the same time, connects the downstream-side portion of the PTO-system power transmission mechanism 52 and the downstream-side portion of the traveling-system power transmission mechanism 51.

In this manner, it is possible to transmit the rotational speed proportional to the rotational speed of the engine 15 to the PTO-shaft 222 (first PTO-system power transmission) with the use of the PTO-system power transmission mechanism 52, while with the use of the changeover mechanism 146, it is possible to perform the changeover manipulation which interrupts the power transmission of the PTO-system power transmission mechanism 52 in the middle portion thereof and, at the same time, connects the downstream-side portion of the PTO-system power transmission mechanism 52 and the downstream-side portion of the traveling-system power transmission mechanism 51 so as to transmit the rotational speed proportional to a vehicle speed to the PTO shaft 222 (second PTO-system power transmission).

Here, the first PTO-system power transmission and the second PTO-system power transmission use the downstream-side portion of the PTO-system power transmission mechanism 52 in common and hence, the structure can be simplified whereby the transmission casing 45 can be made compact and, at the same time, a manufacturing cost can be reduced.

Hereinafter, the constitution of the PTO-system power transmission mechanism 52 is explained more specifically in conjunction with FIG. 3 and FIG. 8.

That is, as shown in FIG. 3, the PTO-system power transmission shaft 169 is arranged in the inside of the transmission casing 45 in a state that the PTO-system power transmission shaft 169 has an axis thereof from a front portion to a rear portion thereof directed in the longitudinal direction, while the PTO-system power transmission shaft 169 is formed by connecting the first to fourth split power transmission shafts 245, 246, 247, 248 in the longitudinal direction.

Then, the first split power transmission shaft 245 is, as shown in FIG. 3 and FIG. 5, rotatably extended between the rear wall 27 of the clutch housing 17 and the above-mentioned inner support wall 57 by way of bearings 249, 250. An input gear 244 is formed on the middle portion of the first split power transmission shaft 245 and the input gear 244 is meshed with the PTO drive gear 20c.

Further, in the second split power transmission shaft 246, as shown in FIG. 3 and FIG. 5, a middle portion thereof is rotatably supported on the above-mentioned support wall forming body 55 by way of a bearing 251 and, at the same time, a front-end portion thereof is connected with a rear-end portion of the above-mentioned first split power transmission shaft 245 by way of a first cylindrical connection body 252.

In the third split power transmission shaft 247, as shown in FIG. 3 and FIG. 8, a middle portion thereof is rotatably supported on the shaft support body 118 by way of a bearing 253 and, at the same time, a front-end portion thereof is connected with a rear-end portion of the above-mentioned second split power transmission shaft 246 by way of the changeover mechanism 146.

Here, the changeover mechanism 146 includes, as shown in FIG. 8, a traveling-system power transmission gear 147 which is mounted on the sub transmission shaft 116 which constitutes a traveling-system power transmission shaft, a PTO-system power transmission gear 148 which is mounted on a distal end portion (a rear end portion) of the second split power transmission shaft 246 which constitutes an upstream-side PTO-system power transmission shaft, and a shift gear body 149 which is mounted on the third split power transmission shaft 247 which is arranged coaxially with the above-mentioned second split power transmission shaft 246 and constitutes a downstream-side PTO-system power transmission shaft.

Further, the shift gear body 149 is formed such that a slide member 151 is mounted on a proximal end portion (a front end portion) of the third split transmission shaft 247 in an axially slidable manner, and a PTO-system-side shaft gear 152 which is meshed with the PTO-system power transmission gear 148 and a traveling-system-side shift gear 153 which is meshed with the traveling-system power transmission gear 147 are formed on the slide member 151.

Here, although not shown in the drawing, the shift manipulation of the shift gear body 149 can be performed using a changeover manipulation means such as a lever mounted on the driver's portion 5 or the like.

Due to such a constitution, by performing the manipulation to allow the above-mentioned shift gear body 149 to slide in the forward direction, it is possible to allow the PTO-system-side shift gear 152 to be meshed with the PTO-system power transmission gear 148 and, at the same time, to release the meshing between the traveling-system power transmission gear 147 and the traveling-system-side shift gear 153. On the other hand, by performing the manipulation to allow the shift gear body 149 to slide in the rearward direction, it is possible to release the meshing between the PTO-system power transmission gear 148 and the PTO-system-side shift gear 152 and, at the same time, to allow the traveling-system-side shift gear 153 to be meshed with the traveling-system power transmission gear 147 thus realizing the selective changeover manipulation.

Here, since the changeover manipulation of the changeover mechanism 146 can be performed by merely allowing the shift gear body 149 to slide on the third split power transmission shaft 247 in the axial direction, it is possible to arrange the changeover mechanism 146 between the sub transmission shaft 116 and the second split power transmission shaft 246 as well as the third split power transmission shaft 247 in a compact manner whereby it is possible to form the transmission casing 45 in a compact manner from this aspect.

In the fourth split power transmission shaft 248, as shown in FIG. 3 and FIG. 8, a front-end portion thereof is connected with a rear-end portion of the above-mentioned third split power transmission shaft 247 by way of a one-way clutch 255 and, at the same time, a rear-end portion thereof is connected with a distal-end portion 240 of the above-mentioned input shaft 220 by way of a third cylindrical connection body 256.

Here, the one-way clutch 255 is formed of a front clutch forming body 257 which is mounted on the rear-end portion of the third split power transmission shaft 247 and a rear clutch forming body 258 which is mounted on the front-end portion of the fourth split power transmission shaft 248. A meshing member 259 which is formed in a projecting manner on a rear surface of the front clutch forming body 257 and a meshing member 260 which is formed in a projecting manner on a front surface of the rear clutch forming body 258 are meshed with each other in a longitudinally facing manner so that, in the right rotation, both of the meshing members 259, 260 are engaged and the third and the fourth split power transmission shafts 247, 248 are integrally rotated in the right rotational direction, while, in the reverse rotation, both of the meshing members 259, 260 are not engaged with each other.

In this manner, in adopting the first PTO-system power transmission mode, by allowing the shift gear body 149 of the changeover mechanism 146 to slide in the frontward direction, the PTO-system-side shift gear 152 is meshed with the PTO-system power transmission gear 148.

Then, the power transmitted to the outer drive shaft 20 from the engine 15 is transmitted to the input shaft 220 by way of the PTO drive gear 20c which is integrally formed with the outer drive shaft 20→the input gear 244→the first split power transmission shaft 245→the first cylindrical connection body 252→the second split power transmission shaft 246→the PTO-system power transmission gear 148→the PTO-system-side shift gear 152→the third split power transmission shaft 247→the one-way clutch 255→the fourth split power transmission shaft 248→the second cylindrical connection body 256→the input shaft 220.

Further, in adopting the second PTO-system power transmission mode, by allowing the shift gear body 149 of the changeover mechanism 146 to slide in the rearward direction, the traveling-system-side shift gear 153 is meshed with the traveling-system power transmission gear 147.

Then, the power transmitted to the inner drive shaft 19 from the engine 15 is transmitted to the input shaft 220 by way of the main-transmission main shaft 58→the planetary gear mechanism 115→the sub transmission shaft 116→the traveling-system power transmission gear 147→the traveling-system-side shift gear 153→the third split power transmission shaft 247→the one-way clutch 255→the fourth split power transmission shaft 248→the second cylindrical connection body 256→the input shaft 220.

Then, when the PTO transmission mechanism 201 performs the first PTO transmission manipulation, the power transmitted to the input shaft 220 is transmitted to the PTO shaft 222 by way of the output gear 229→the large-diameter input gear 230→the transmission shaft 221→the first transmission gear 231→the large-diameter shift gear 236 of the shift gear body 233→the input shaft 220, and the power is taken out from the PTO shaft 222 so as to drive the respective working machines.

Further, when the PTO transmission mechanism 201 performs the second PTO transmission manipulation, the power transmitted to the input shaft 220 is transmitted to the PTO shaft 222 by way of the output gear 229→the large-diameter input gear 230→the transmission shaft 221→the second transmission gear 232→the input gear 235→the small-diameter shift gear 237 of the shift gear body 233→the PTO shaft 222 and, the power is taken out from the PTO shaft 222 so as to drive the respective working machines.

Here, even when the interruption manipulation of the PTO clutch 22 is performed, various working machines are driven by inertia and, as a result, the PTO shaft 22 is also rotated. However, even when the power is transmitted to the fourth split power transmission shaft 248 by way of the input shaft 220→third cylindrical connection body 256→the fourth split power transmission shaft 248, a one-way clutch 255 is interposed between the fourth split power transmission shaft 248 and the third split power transmission shaft 247 and hence, the power is not transmitted to the third split power transmission shaft 247 from the fourth split power transmission shaft 248.

Here, since the one-way clutch 255 is provided at a downstream side of the changeover mechanism 146, in either one of the first PTO-system power transmission mode and the second PTO-system power transmission mode, there is no possibility that the power is transmitted as a backflow to the traveling-system power transmission mechanism 51 such as the main transmission mechanism 46 from the PTO shaft 222. Accordingly, it is possible to surely prevent the occurrence of a drawback that the traveling-system power transmission mechanism 51 is damaged.

Figure 12:
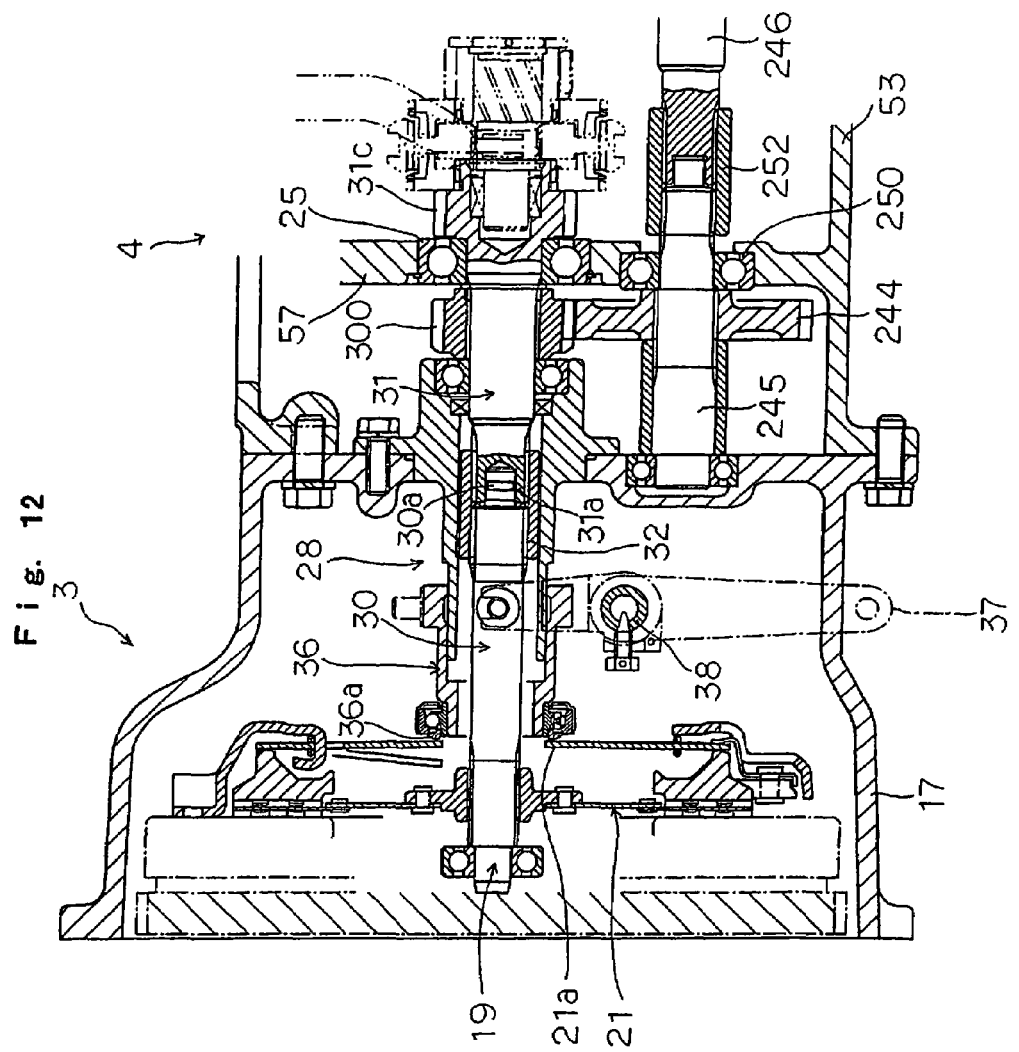
FIG. 12 is a cross-sectional side view of a clutch part of a single-clutch specification.

Particularly, as shown in FIG. 12, in the clutch part 3 of the single clutch specification, the input gear 244 which is mounted on the first split power transmission shaft 245 is meshed with the PTO drive gear 300 mounted on the rear split drive shaft member 31 and hence, when the interruption manipulation of the traveling clutch 21 is performed, with the use of the one-way clutch 255, it is possible to surely prevent the backflow of the power by way of the first split power transmission shaft 245→the input gear 244→the PTO drive gear 300→the rear split drive shaft member 31→the main-transmission main shaft 58.

Then, by arranging the one-way clutch 255 in the inside of the casing body 54, in performing the changeover of the specification between a double-clutch specification which uses the traveling clutch 21 and the PTO clutch 22 as shown in FIG. 8 and a single clutch specification which uses only the traveling clutch 21 as shown in FIG. 12, it is possible to easily change over the clutch specification by merely replacing only the clutch portion 3 while maintaining the inside of the transmission casing 45 as it is as a common portion.

Further, in this embodiment, the PTO transmission part 6 which includes the PTO shaft 222 is detachably mounted on a rear portion of the casing body 54 and, at the same time, the distal end portion 240 of the input shaft 220 mounted on the PTO transmission part 6 is detachably connected with the distal end portion (rear end portion) 154 of the fourth split power transmission shaft 248 which constitutes the downstream-side end portion of the PTO-system power transmission mechanism 52 by way of the second cylindrical connection body 256.

In this manner, the PTO transmission part 6 is detachably mounted on the casing body 54, by removing the PTO transmission part 6 from the casing body 54, it is possible to easily perform the maintenance of the inside of the PTO transmission part 6.

Here, the input shaft 220 which is mounted on the PTO transmission part 6 is detachably connected to the fourth split power transmission shaft 248 which constitutes the downstream-side end portion of the PTO-system power transmission mechanism 52 and hence, by removing the input shaft 220 from the fourth split power transmission shaft 248, it is possible to easily perform the operation to remove the PTO transmission part 6 and, at the same time, by connecting the fourth split power transmission shaft 248 to the input shaft 220, it is possible to easily perform the operation to mount the PTO transmission part 6.

Further, since the changeover mechanism 146 is not disposed in the inside of the PTO transmission part 6, the structure of the inside of the PTO transmission part 6 can be simplified, whereby the PTO transmission part 6 can be formed in a compact manner thus facilitating the mounting and dismounting operation of the PTO transmission part 6 from this aspect.

Further, in this embodiment, as shown in FIG. 6, the main-transmission sub shaft 70, the counter gear support shaft 75 and the PTO-system power transmission shaft 169 are arranged in a concentrated manner below the main-transmission main shaft 58 and the sub transmission shaft 116 and hence, it is possible to form the transmission casing 45 in a compact manner.

INDUSTRIAL APPLICABILITY (1) According to the present invention described in claim 1, in the inside of the transmission casing, the traveling-system power transmission mechanism which is interposed between the engine and the axel, the PTO-system power transmission mechanism which is interposed between the engine and the PTO shaft, and the changeover mechanism which is interposed between both power transmission mechanisms are provided, the power transmission of the PTO-system power transmission mechanism is interrupted at the middle portion thereof by the changeover mechanism and, at the same time, the changeover mechanism is allowed to perform the changeover manipulation to connect the downstream side portion of the PTO-system power transmission mechanism and the downstream side portion of the traveling-system power transmission mechanism.

In this manner, it is possible to transmit the rotational speed proportional to the rotational speed of the engine to the PTO-shaft (first PTO-system power transmission) with the use of the PTO-system power transmission mechanism, while with the use of the changeover mechanism, it is possible to perform the changeover manipulation which interrupts the power transmission of the PTO-system power transmission mechanism in the middle portion thereof and, at the same time, connects the downstream-side portion of the PTO-system power transmission mechanism and the downstream-side portion of the traveling-system power transmission mechanism of the PTO-system power transmission mechanism so as to transmit the rotational speed proportional to a vehicle speed to the PTO shaft (second PTO-system power transmission).

Here, the first PTO-system power transmission and the second PTO-system power transmission use the downstream-side portion of the PTO-system power transmission mechanism in common and hence, the structure can be simplified whereby the transmission casing can be made compact and, at the same time, a manufacturing cost can be reduced.

(2) According to the present invention described in claim 2, the changeover mechanism includes the traveling-system power transmission gear which is mounted on the traveling-system power transmission shaft which constitutes the portion of the traveling-system power transmission mechanism, the PTO-system power transmission gear which is mounted on the upstream-side PTO-system power transmission shaft which constitutes the portion of the PTO-system power transmission mechanism, and the shift gear body which is arranged coaxially with the above-mentioned upstream-side PTO-system power transmission shaft and is mounted on a downstream-side PTO-system power transmission shaft which constitutes a portion of the PTO-system power transmission mechanism, wherein the shift gear body is formed by mounting the slide member on the downstream-side PTO-system power transmission shaft in an axially slidable manner and by forming the PTO-system side shift gear which is meshed with the PTO-system power transmission gear and the traveling-system side shift gear which is meshed with the traveling-system power transmission gear on the slide member, whereby with the sliding of the above-mentioned slide member, it is possible to perform the manipulation to selectively changeover the meshing between the PTO-system power transmission gear and the PTO-system side shift gear and the meshing between the traveling-system power transmission gear and the traveling-system-side shift gear.

Since the changeover manipulation of the changeover mechanism can be performed by merely allowing the shift gear body to slide on the downstream-side PTO-system power transmission shaft in the axial direction, it is possible to arrange the changeover mechanism between the traveling-system power transmission shaft and the upstream/downstream side PTO-system power transmission shaft in a compact manner whereby it is possible to form the transmission casing in a compact manner from this aspect.

(3) According to the present invention described in claim 3, the PTO transmission part which includes the PTO shaft is detachably mounted on the transmission casing and, at the same time, the input shaft which is provided to the PTO transmission part is detachably connected to the downstream-side end portion of the PTO-system power transmission mechanism.

In this manner, the PTO transmission part is detachably mounted on the transmission casing, by removing the PTO transmission part from the transmission casing, it is possible to easily perform the maintenance of the inside of the PTO transmission part.

Here, the input shaft which is mounted on the PTO transmission part is detachably connected to the downstream-side end portion of the PTO-system power transmission mechanism and hence, by removing the input shaft from the downstream-side end portion of the PTO-system power transmission mechanism, it is possible to easily perform the operation to remove the PTO transmission part and, at the same time, by connecting the input shaft to the downstream-side end portion of the PTO-system power transmission mechanism, it is possible to easily perform the operation to mount the PTO transmission part.

Further, since the changeover mechanism is not disposed in the inside of the PTO transmission part, the structure of the inside of the PTO transmission part can be simplified, whereby the PTO transmission part can be formed in a compact manner thus facilitating the mounting and dismounting operation of the PTO transmission part from this aspect.

The invention claimed is:

1. A tractor comprising a transmission casing, a traveling-system power transmission mechanism provided in the transmission casing and interposed between an engine and an axle, a PTO-system power transmission mechanism provided in the transmission casing and interposed between the engine and a PTO shaft, and a changeover mechanism provided in the transmission casing and interposed between both power transmission mechanisms, wherein when the power transmission of the PTO-system power transmission mechanism is interrupted at a middle portion thereof by the changeover mechanism the changeover mechanism is configured so as to be capable of performing a changeover manipulation to connect a downstream side portion of the PTO-system power transmission mechanism and a downstream side portion of the traveling-system power transmission mechanism, the changeover mechanism is comprised of a traveling-system power transmission gear which is mounted on a traveling-system power transmission shaft which constitutes a portion of the traveling-system power transmission mechanism, a PTO-system power transmission gear which is mounted on an upstream-side PTO-system power transmission shaft which constitutes a portion of the PTO-system power transmission mechanism, and a shift gear body which is arranged coaxially with the upstream-side PTO-system power transmission shaft and is mounted on a downstream-side PTO-system power transmission shaft which constitutes a portion of the PTO-system power transmission mechanism, and the shift gear body is formed by mounting a slide member on the downstream-side PTO-system power transmission shaft in an axially slidable manner and by forming a PTO-system side shift gear which is meshed with the PTO-system power transmission gear and a traveling-system side shift gear which is meshed with the traveling-system power transmission gear on the slide member thereby, with the sliding of the slide member, enabling a manipulation to selectively change over the meshing between the PTO-system power transmission gear and the PTO-system side shift gear and the meshing between the traveling-system power transmission gear and the traveling-system-side shift gear.

2. A tractor according to claim 1, wherein a PTO transmission part which comprises the PTO shaft is detachably mounted on the transmission casing and an input shaft which is provided to the PTO transmission part is detachably connected to a downstream-side end portion of the PTO-system power transmission mechanism.

* * * * *